United States Patent
Spencer et al.

(10) Patent No.: US 11,149,938 B2
(45) Date of Patent: Oct. 19, 2021

(54) LUMINAIRE SYSTEM WITH TRIM COMPONENT AND INTEGRATED USER EXPERIENCE ELEMENTS

(71) Applicant: ABL IP Holding LLC, Atlanta, GA (US)

(72) Inventors: Charles Jeffrey Spencer, Wilmette, IL (US); Towfiq M. Chowdhury, Lake Forest, IL (US); Mohammad Bani Hani, Glenview, IL (US); Daniel Francis Posacki, Wheaton, IL (US); Kyle Michael Bradd, Park Ridge, IL (US); Gregory Philip Frankiewicz, Elmhurst, IL (US); Feng Chen, Hoffman Estates, IL (US); John Glenn Serra, Pingree Grove, IL (US); Darcie Renee Callison, Palatine, IL (US)

(73) Assignee: ABL IP Holding LLC, Atlanta, GA (US)

(*) Notice: Subject to any disclaimer, the term of this patent is extended or adjusted under 35 U.S.C. 154(b) by 30 days.

(21) Appl. No.: 16/659,344

(22) Filed: Oct. 21, 2019

(65) Prior Publication Data
US 2020/0124271 A1    Apr. 23, 2020

Related U.S. Application Data

(60) Provisional application No. 62/748,248, filed on Oct. 19, 2018, provisional application No. 62/748,253, (Continued)

(51) Int. Cl.
*F21V 33/00* (2006.01)
*F21V 8/00* (2006.01)
(Continued)

(52) U.S. Cl.
CPC ........ *F21V 33/0056* (2013.01); *F16M 13/027* (2013.01); *F21S 8/026* (2013.01);
(Continued)

(58) Field of Classification Search
CPC .... F21S 8/026; F21V 33/0056; G02B 6/0066; G02B 6/0068; H04R 1/025; H04R 1/028
See application file for complete search history.

(56) References Cited

U.S. PATENT DOCUMENTS

| 4,346,640 A | 8/1982 | Zeno et al. |
| 5,424,859 A | 6/1995 | Uehara et al. |

(Continued)

FOREIGN PATENT DOCUMENTS

| CA | 3071829 | 2/2019 |
| CN | 202735830 | 2/2013 |

(Continued)

OTHER PUBLICATIONS

Sung et al., Design and Implementation of a Smart LED Lighting System Using a Self Adaptive Weighted Data Fusion Algorithm, Sensors, vol. 13, No. 12, Dec. 2013, 25 pages.
(Continued)

*Primary Examiner* — Keith G. Delahoussaye
(74) *Attorney, Agent, or Firm* — Kilpatrick Townsend & Stockton LLP

(57) ABSTRACT

A luminaire includes a first light source positioned at a first level of a luminaire housing. The first light source generates a light output. The luminaire also includes a trim component positioned at a second level of the luminaire housing different from the first level. The trim component includes a visual feedback element that emits a visual feedback response. Further, the luminaire includes a control circuit
(Continued)

positioned at the second level within the trim component. The control circuit controls operation of the visual feedback element.

17 Claims, 11 Drawing Sheets

Related U.S. Application Data filed on Oct. 19, 2018, provisional application No. 62/748,268, filed on Oct. 19, 2018, provisional application No. 62/748,283, filed on Oct. 19, 2018.

(51) Int. Cl.
| | |
|---|---|
| *F16M 13/02* | (2006.01) |
| *H04R 1/02* | (2006.01) |
| *F21V 23/00* | (2015.01) |
| *H04R 7/12* | (2006.01) |
| *G09G 3/34* | (2006.01) |
| *H04R 3/12* | (2006.01) |
| *F21S 8/02* | (2006.01) |

(52) U.S. Cl.
CPC .......... *F21V 23/003* (2013.01); *G02B 6/0066* (2013.01); *G02B 6/0073* (2013.01); *G09G 3/3426* (2013.01); *H04R 1/025* (2013.01); *H04R 1/028* (2013.01); *H04R 3/12* (2013.01); *H04R 7/122* (2013.01)

(56) References Cited

U.S. PATENT DOCUMENTS

| | | | |
|---|---|---|---|
| 6,000,493 | A | 12/1999 | Chen |
| 6,343,135 | B1 | 1/2002 | Ellero et al. |
| 6,528,954 | B1 | 3/2003 | Lys et al. |
| 6,548,967 | B1 | 4/2003 | Dowling et al. |
| 6,748,096 | B2 | 6/2004 | Chuang |
| 7,162,258 | B2 | 1/2007 | Beach et al. |
| 7,446,671 | B2 | 11/2008 | Giannopoulos et al. |
| 7,741,782 | B2 | 6/2010 | Vermeulen et al. |
| 7,976,048 | B2 | 7/2011 | Bartolome et al. |
| 8,033,686 | B2 | 10/2011 | Recker et al. |
| 8,251,544 | B2 | 8/2012 | Ivey et al. |
| 8,282,227 | B2 | 10/2012 | Massara et al. |
| 8,445,826 | B2 | 5/2013 | Verfuerth |
| 8,476,565 | B2 | 7/2013 | Verfuerth |
| 8,586,902 | B2 | 11/2013 | Verfuerth |
| 8,628,216 | B2 | 1/2014 | Ivey et al. |
| 8,675,887 | B2 | 3/2014 | Yuan et al. |
| 8,731,689 | B2 | 5/2014 | Platner et al. |
| 8,829,821 | B2 | 9/2014 | Chobot et al. |
| 8,912,735 | B2 | 12/2014 | Chobot et al. |
| 8,981,646 | B2 | 3/2015 | Kim |
| 9,053,622 | B2 | 6/2015 | Scalisi |
| 9,081,269 | B2 | 7/2015 | Conti |
| 9,115,886 | B2 | 8/2015 | Lam et al. |
| 9,143,230 | B2 | 9/2015 | Casaccia et al. |
| 9,143,741 | B1 | 9/2015 | Fu et al. |
| 9,161,111 | B2 | 10/2015 | Yuan et al. |
| 9,163,816 | B2 | 10/2015 | Baschnagel |
| 9,172,917 | B1 | 10/2015 | Fu et al. |
| 9,267,675 | B2 | 2/2016 | Wu |
| 9,294,828 | B2 | 3/2016 | Rutherford |
| 9,303,863 | B2 | 4/2016 | Vaidya |
| 9,313,575 | B2 | 4/2016 | Wang et al. |
| 9,320,101 | B2 | 4/2016 | Sun et al. |
| 9,328,913 | B2 | 5/2016 | Yotsumoto et al. |
| 9,353,939 | B2 | 5/2016 | Simon et al. |
| 9,433,061 | B2 | 8/2016 | Chobot |
| 9,438,976 | B2 | 9/2016 | Wang et al. |
| 9,441,634 | B2 | 9/2016 | Spiro |
| 9,532,438 | B2 | 12/2016 | Leung et al. |
| 9,554,089 | B2 | 1/2017 | Tang et al. |
| 9,561,449 | B2 | 2/2017 | Wang et al. |
| 9,568,184 | B2 | 2/2017 | Kasuga |
| 9,572,226 | B2 | 2/2017 | Motley et al. |
| 9,574,763 | B2 | 2/2017 | Chen |
| 9,596,716 | B2 | 3/2017 | Deng et al. |
| 9,602,787 | B2 | 3/2017 | Blaser, Jr. et al. |
| 9,635,740 | B2 | 4/2017 | Sun et al. |
| 9,642,221 | B2 | 5/2017 | Schlangen |
| 9,642,222 | B2 | 5/2017 | Fathollahi et al. |
| 9,651,243 | B1 | 5/2017 | Springer |
| 9,654,678 | B1 | 5/2017 | Fu et al. |
| 9,655,216 | B2 | 5/2017 | Murakami et al. |
| 9,668,053 | B1 | 5/2017 | Rivera et al. |
| 9,713,228 | B2 | 7/2017 | Reed |
| 9,717,132 | B2 | 7/2017 | Sun et al. |
| 9,726,360 | B1 | 8/2017 | Alexander et al. |
| 9,739,472 | B1 | 8/2017 | Li |
| 9,746,138 | B1 | 8/2017 | Thomas |
| 9,750,118 | B2 | 8/2017 | Yotsumoto et al. |
| 9,759,421 | B1 | 9/2017 | Baschnagel |
| 9,765,959 | B2 | 9/2017 | Yim et al. |
| 9,784,417 | B1 | 10/2017 | Springer |
| 9,794,690 | B2 | 10/2017 | Wang et al. |
| 9,800,429 | B2 | 10/2017 | Crayford et al. |
| 9,805,575 | B2 | 10/2017 | Sun et al. |
| 9,807,506 | B2 | 10/2017 | Wang et al. |
| 9,820,024 | B1 | 11/2017 | Rolf |
| 9,822,963 | B2 | 11/2017 | Wang et al. |
| 9,826,298 | B2 | 11/2017 | Sun et al. |
| 9,838,652 | B2 | 12/2017 | Chien |
| 9,848,265 | B2 | 12/2017 | Wen et al. |
| 9,851,092 | B2 | 12/2017 | Yotsumoto et al. |
| 9,874,334 | B2 | 1/2018 | Chen |
| 9,939,143 | B2 | 4/2018 | Spiro |
| 9,955,541 | B2 | 4/2018 | Dowling et al. |
| 9,958,149 | B2 | 5/2018 | You et al. |
| 10,009,982 | B2 | 6/2018 | Ben-Moshe et al. |
| 10,034,356 | B2 | 7/2018 | Sun et al. |
| 10,098,211 | B2 | 10/2018 | Recker et al. |
| 10,111,296 | B2 | 10/2018 | Wu et al. |
| 10,139,099 | B2 * | 11/2018 | Ivey .............. F21V 33/0056 |
| 2004/0175014 | A1 | 9/2004 | Liu |
| 2007/0086724 | A1 | 4/2007 | Grady et al. |
| 2007/0222631 | A1 | 9/2007 | Haase |
| 2007/0223770 | A1 | 9/2007 | Fujisawa et al. |
| 2008/0143495 | A1 * | 6/2008 | Haase .................. F21K 9/00 |
| | | | 340/326 |
| 2009/0136076 | A1 * | 5/2009 | Chi ................. H04R 1/026 |
| | | | 381/387 |
| 2011/0062888 | A1 | 3/2011 | Bondy et al. |
| 2011/0121654 | A1 | 5/2011 | Recker et al. |
| 2011/0260652 | A1 | 10/2011 | Hsieh |
| 2011/0317846 | A1 | 12/2011 | Yuan et al. |
| 2012/0218978 | A1 | 8/2012 | Ishidoshiro |
| 2013/0049633 | A1 | 2/2013 | Wann et al. |
| 2013/0308315 | A1 | 11/2013 | Capitani et al. |
| 2013/0320861 | A1 | 12/2013 | Sinai et al. |
| 2014/0118120 | A1 | 5/2014 | Chen et al. |
| 2014/0270264 | A1 | 9/2014 | Wang et al. |
| 2014/0285113 | A1 | 9/2014 | Huang |
| 2014/0286011 | A1 | 9/2014 | Luna et al. |
| 2014/0286517 | A1 | 9/2014 | Luna et al. |
| 2014/0300293 | A1 | 10/2014 | Ruan et al. |
| 2014/0328484 | A1 | 11/2014 | Molinie et al. |
| 2014/0354160 | A1 | 12/2014 | Aggarwal et al. |
| 2015/0043426 | A1 | 2/2015 | Aggarwal et al. |
| 2015/0084518 | A1 | 3/2015 | Takahashi |
| 2015/0130355 | A1 | 5/2015 | Rains, Jr. et al. |
| 2015/0153037 | A1 | 6/2015 | Lee |
| 2015/0312394 | A1 | 10/2015 | Mirza et al. |
| 2016/0050493 | A1 | 2/2016 | Wang et al. |
| 2016/0061438 | A1 | 3/2016 | Lu |
| 2016/0128154 | A1 | 5/2016 | Barnetson et al. |
| 2016/0128167 | A1 | 5/2016 | Sun et al. |
| 2016/0154171 | A1 | 6/2016 | Kato et al. |
| 2016/0198542 | A1 | 7/2016 | Chiang |
| 2016/0198547 | A1 | 7/2016 | Pan et al. |
| 2016/0205362 | A1 | 7/2016 | Tang et al. |

(56) References Cited

U.S. PATENT DOCUMENTS

| | | | |
|---|---|---|---|
| 2016/0205477 | A1 | 7/2016 | Kuribayashi et al. |
| 2016/0215933 | A1 | 7/2016 | Skelton et al. |
| 2016/0227633 | A1 | 8/2016 | Sun et al. |
| 2016/0230982 | A1 | 8/2016 | Simon et al. |
| 2016/0234414 | A1 | 8/2016 | Chen |
| 2016/0261824 | A1 | 9/2016 | Scalisi |
| 2016/0270148 | A1 | 9/2016 | Filipovic et al. |
| 2016/0284176 | A1 | 9/2016 | Harrington et al. |
| 2016/0295668 | A1 | 10/2016 | Saijo |
| 2017/0187154 | A1 | 6/2017 | Skelton et al. |
| 2017/0237471 | A1 | 8/2017 | Green et al. |
| 2017/0238397 | A1 | 8/2017 | Green et al. |
| 2017/0238400 | A1 | 8/2017 | Fathollahi et al. |
| 2017/0244148 | A1 | 8/2017 | Ge et al. |
| 2017/0295629 | A1 | 10/2017 | Chiu et al. |
| 2017/0311062 | A1 | 10/2017 | Garrett et al. |
| 2017/0366886 | A1 | 12/2017 | Bernier |
| 2018/0050634 | A1* | 2/2018 | White .................. A47L 9/2805 |
| 2018/0051872 | A1 | 2/2018 | Ivey et al. |
| 2018/0063659 | A1 | 3/2018 | Pan |
| 2018/0077779 | A1 | 3/2018 | Johnson |
| 2018/0077781 | A1 | 3/2018 | McCanless et al. |
| 2018/0356089 | A1* | 12/2018 | Zhang ................ F21V 33/0056 |
| 2019/0041050 | A1 | 2/2019 | Cairns et al. |
| 2019/0394547 | A1* | 12/2019 | Lemons ................ G10L 15/28 |

FOREIGN PATENT DOCUMENTS

| | | |
|---|---|---|
| CN | 203193950 | 9/2013 |
| CN | 103809548 | 5/2014 |
| CN | 203605159 | 5/2014 |
| CN | 103899963 | 7/2014 |
| CN | 203801112 | 8/2014 |
| CN | 104020733 | 9/2014 |
| CN | 104378886 | 2/2015 |
| CN | 204231709 | 3/2015 |
| CN | 204442783 | 7/2015 |
| CN | 107250930 | 10/2017 |
| EP | 2506686 | 10/2012 |
| EP | 3036594 | 6/2016 |
| KR | 101641510 | 7/2016 |
| KR | 20160100656 | 8/2016 |
| WO | 2011125845 | 10/2011 |
| WO | 2014084413 | 6/2014 |
| WO | 2014160096 | 10/2014 |
| WO | 2014186040 | 11/2014 |
| WO | 2016052956 | 4/2016 |
| WO | 2016066564 | 5/2016 |
| WO | 2017043671 | 3/2017 |
| WO | 2017062776 | 4/2017 |
| WO | 2017157120 | 9/2017 |
| WO | 2017193781 | 11/2017 |
| WO | 2017215406 | 12/2017 |

OTHER PUBLICATIONS

U.S. Appl. No. 16/659,341, Final Office Action, dated Oct. 6, 2020, 15 pages.

U.S. Appl. No. 16/659,348, Non-Final Office Action, dated Dec. 4, 2020, 11 pages.

"Gasket", Wikipedia, Available online at: https://en.wikipedia.org/wiki/Gasket, May 1, 2020, 7 pages.

U.S. Appl. No. 16/659,341, Non-Final Office Action, dated May 7, 2020, 14 pages.

U.S. Appl. No. 16/659,341, Non-Final Office Action, dated Feb. 3, 2021, 15 pages.

Application No. CA 3,059,289, Office Action, dated Dec. 11, 2020, 3 pages.

Application No. CA 3,059,292, Office Action, dated Nov. 26, 2020, 4 pages.

Application No. CA 3,059,316, Office Action, dated Nov. 27, 2020, 5 pages.

U.S. Appl. No. 16/659,348, Final Office Action, dated May 7, 2021, 12 pages.

Canadian Application No. CA 3,059,316, Office Action dated May 17, 2021, 3 pages.

* cited by examiner

LUMINAIRE SYSTEM WITH TRIM COMPONENT AND INTEGRATED USER EXPERIENCE ELEMENTS

CROSS-REFERENCE TO RELATED APPLICATIONS

This disclosure claims priority to U.S. Provisional Application No. 62/748,248 entitled "Component Integration of Elements Associated with a Luminaire," filed Oct. 19, 2018, to U.S. Provisional Application No. 62/748,253 entitled "Light Fixtures with Integrated Speakers," filed Oct. 19, 2018, to U.S. Provisional Application No. 62/748,268 entitled "Light Fixtures with User Experience Capabilities," filed Oct. 19, 2018, and to U.S. Provisional Application No. 62/748,283 entitled "Light Fixtures with Virtual Assistant Functionality," filed Oct. 19, 2018, the entireties of which are hereby incorporated by reference herein.

TECHNICAL FIELD

This disclosure relates generally to luminaire systems. More specifically, but not by way of limitation, this disclosure relates to luminaire systems that seamlessly integrate user experience capabilities.

BACKGROUND

Connected lighting can include lamps, luminaires, and controls that communicate through technologies such as WiFi, Bluetooth, or any other communication protocols to provide an increased level of control of the lamps, luminaires, and controls. The connected lighting may be controlled with smartphone applications, web portals, voice-activated devices, other control mechanisms, or any combination thereof.

In some examples, it may be desirable to provide visual feedback from the connected lighting to enhance a user experience with the connected lighting. A connected lighting device (e.g., a wireless communication enabled lighting element) that is retrofitted within a luminaire that includes a traditional trim may provide visual feedback, such as Wi-Fi connection, Bluetooth connection, battery status indicators, or responses to user commands themselves. This visual feedback may be accomplished through a refitted fixture or lamp, but not through a trim component of an installed housing. Because visual feedback response is not provided at the trim level of the luminaire, it can be difficult for the user to actually see any visual feedback responses from the smart lighting device. For example, the user may need to be positioned directly or near directly beneath the luminaire to view a light emitting region directly. Such positioning may be unpleasant depending on the light level output by the luminaire. Additionally, the visual feedback can be washed out or hard to distinguish due to proximity of visual status indicator elements to general light emitting areas of the luminaire.

SUMMARY

Certain aspects involve connected lighting systems including user experience elements. For instance, a luminaire includes a first light source positioned at a first level of a luminaire housing. The first light source generates a light output. The luminaire also includes a trim component positioned at a second level of the luminaire housing different from the first level, The trim component includes a visual feedback element that emits a visual feedback response. Further, the luminaire includes a control circuit positioned at the second level within the trim component. The control circuit controls operation of the visual feedback element.

In another example, a luminaire includes a first light source positioned at a first level of a luminaire housing. The first light source is generates a light output. Additionally, the luminaire includes a trim component positioned at a second level of the luminaire housing different from the first level. The trim component includes a visual feedback element that emits a visual feedback response. Further, the luminaire includes a baffle extending from the first level to the second level.

In another example, a luminaire includes a first light source that generates a light output. The luminaire also includes a second light source that generates a visual feedback response output at a visual feedback element. Further, the luminaire includes a speaker that generates an audio output from the luminaire. Furthermore, the luminaire includes a control circuit that controls operation of the visual feedback element and a wireless interface that communicatively couples the luminaire with other devices.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

The present disclosure relates to light fixtures having integrated user experience capabilities. In particular, the light fixtures include visual feedback elements or lighting capable of providing information through visual signals to a user of the light fixtures. While the descriptions included below generally refer to the light fixtures as downlighting devices, other types of lights may perform the same functions in the same or similar manner.

The subject matter of the presently disclosed embodiments is described herein with specificity to meet statutory requirements, but this description is not necessarily intended to limit the scope of the presently disclosed subject matter. The disclosed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
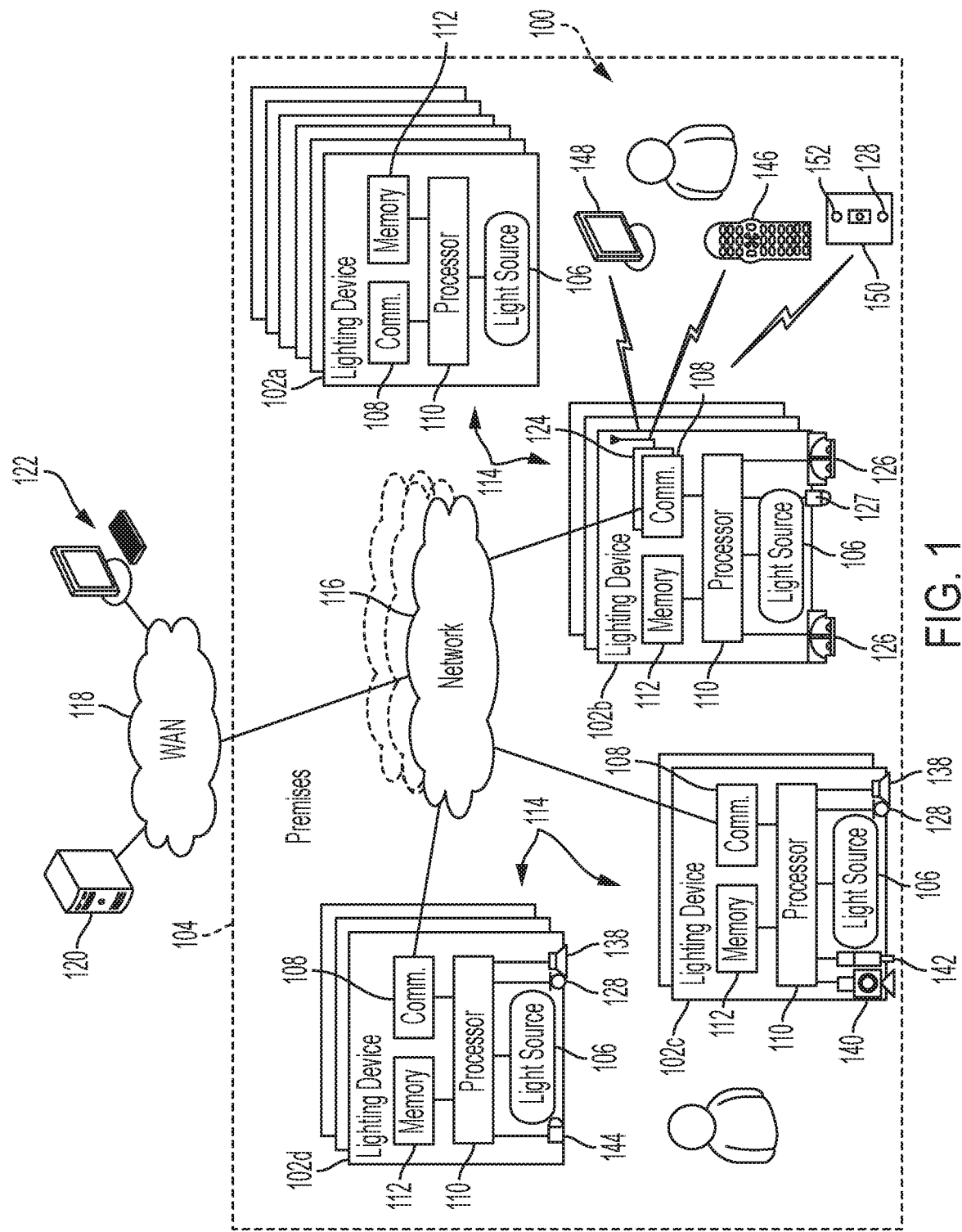
FIG. 1 depicts a block diagram of a light system including intelligent luminaires, according to certain aspects of the present disclosure.

FIG. 1 is a block diagram depicting a light system 100. The illustrated light system 100 includes a number of intelligent luminaires 102, such as recessed lights, pendant lights, fluorescent fixtures, lamps, etc. The intelligent luminaires 102 are represented in several different configurations. In another example, the intelligent luminaires 102 may all include the same configuration. Additionally, one or more of the intelligent luminaires 102 may be replaced by other connected devices (i.e., devices that are controllable through wired or wireless communication by other devices).

The intelligent luminaires 102 illuminate a service area to a level useful for a human in or passing through a space. One or more of the intelligent luminaires 102 in or on a premises 104 served by the light system 100 may have other lighting purposes, such as signage for an entrance to the premises 104 or to indicate an exit from the premises 104. The intelligent luminaires may also be configured for any other lighting or non-lighting purposes.

In an example, each of the intelligent luminaires 102 include a light source 106, a communication interface 108, and a processor 110 coupled to control the light source 106. The light sources 106 may be any type of light source suitable for providing illumination that may be electronically controlled. The light sources 106 may all be of the same type (e.g., all formed by some combination of light emitting diodes), or the light sources may have different types of light sources 106.

The processor 110 is coupled to communicate using the communication interface 108 and a network link with one or more others of the intelligent luminaires 102 and is able to control operations of at least the respective intelligent luminaire 102. The processor 110 may be implemented using hardwired logic circuitry, but in an example, the processor 110 may also be a programmable processor such as a central processing unit (CPU) of a microcontroller or a microprocessor. In the example of FIG. 1, each intelligent luminaire 102 also includes a memory 112, which stores programming for execution by the processor 110 and data that is available to be processed or has been processed by the processor 110. The processors 110 and memories 112 in the intelligent luminaires 102 may be substantially the same throughout the devices 114 throughout the premises 104, or different devices 114 may have different processors 110, different amounts of memory 112, or both depending on differences in intended or expected processing needs.

In an example, the intelligence (e.g., the processor 110 and the memory 112) and the communications interface(s) 108 are shown as integrated with the other elements of the intelligent luminaire 102 or attached to the fixture or other element that incorporates the light source 106. However, for some installations, the light source 106 may be attached in such a way that there is some separation between the fixture or other element that incorporates the electronic components that provide the intelligence and communication capabilities. For example, the communication interface(s) 108 and possibly the processor 110 and the memory 112 may be elements of a separate device or component that is coupled or collocated with the light source 106.

The light system 100 is installed at the premises 104. The light system 100 may include a data communication network 116 that interconnects the links to and from the communication interfaces 108 of the intelligent luminaires 102. In an example, interconnecting the intelligent luminaires 102 across the data communication network 116 may provide data communications amongst the intelligent luminaires 102. Such a data communication network 116 may also provide data communications for at least some of the intelligent luminaires 102 via a data network 118 outside the premises, shown by way of example as a wide area network (WAN), so as to allow the intelligent luminaires 102 or other connected devices at the premises 104 to communicate with outside devices such as a server or host computer 120 or a user terminal device 122. The wide area network 118 outside the premises 104 may be an intranet or the Internet, for example.

The intelligent luminaires 102, as well as any other equipment of the light system 100 or that uses the communication network 116 in a service area of the premises 104, connect together with and through the network links and any other media forming the communication network 116. For lighting operations, the intelligent luminaires 102 (and other system elements) for a given service area are coupled together for network communication with each other through data communication media to form a portion of a physical data communication network. Similar elements in other service areas of the premises are coupled together for network communication with each other through data communication media to form one or more other portions of the physical data communication network at the premises 104. The communication interface 108 in each intelligent luminaire 102 in a particular service area may be of a physical type and operate in a manner that is compatible with the physical media and electrical protocols implemented for the particular service area or throughout the premises 104. Although the communication interfaces 108 are shown communicating to and from the communication network 116 using lines, such as wired links or optical fibers, some or all of the communication interfaces 108 may use wireless communications media such as optical or radio frequency wireless communication.

Various network links within a service area, amongst devices in different areas or to wider portions of the communication network 116 may utilize any convenient data communication media, such as power line wiring, separate wiring such as coaxial or Ethernet cable, optical fiber, free-space optical, or radio frequency wireless (e.g., Bluetooth or WiFi). The communication network 116 may utilize combinations of available networking technologies. Some or all of the network communication media may be used by or made available for communications of other gear, equipment, or systems within the premises 104. For example, if combinations of WiFi and wired or fiber Ethernet are used for the lighting system communications, the WiFi and Ethernet may also support communications for various computer and/or user terminal devices that the occupant(s) may want to use in the premises 104. The data communications media may be installed at the time as part of installation of the light system 100 at the premises 104 or may already be present from an earlier data communication installation. Depending on the size of the communication network 116 and the number of devices and other equipment expected to use the communication network 116 over the service life of the communication network 116, the communication network 116 may also include one or more packet switches, routers, gateways, etc.

In addition to the communication interface 108 for enabling a lighting device to communicate via the communication network 116, some of the devices 11 may include an additional communication interface, shown as a wireless interface 124 in the intelligent luminaire 102b. The additional wireless interface 124 allows other elements or equipment to access the communication capabilities of the light system 100, for example, as an alternative user interface access or for access through the light system 100 to the WAN 118. In an example, the wireless interface 124 may communicate wirelessly with other devices through slot antennas or inverted F slot antennas positioned on a trim component of the intelligent luminaire 102b.

The host computer or server 120 can be any suitable network-connected computer, tablet, mobile device or the like programmed to implement desired network-side functionalities. Such a device may have any appropriate data communication interface to link to the WAN 118. Alternatively or in addition, the host computer or server 120 may be operated at the premises 104 and utilize the same networking media that implements the data communication network 116.

The user terminal device 122 may be implemented with any suitable processing device that can communicate and offer a suitable user interface. The user terminal device 122, for example, is shown as a desktop computer with a wired link into the WAN 118. Other terminal types, such as laptop computers, notebook computers, netbook computers, and smartphones may serve as the user terminal device 122. Also, although shown as communicating via a wired link from the WAN 118, such a user terminal device may also or alternatively use wireless or optical media, and such a device may be operated at the premises 104 and utilize the same networking media that implements the data communication network 116.

The external elements, represented generally by the server or host computer 120 and the user terminal device 122, which may communicate with the intelligent luminaires 102 of the system 100 at the premises 104, may be used by various entities or for various purposes in relation to operation of the light system 100 or to provide information or other services to users within the premises 104.

In the example of the light system 100, at least one of the intelligent luminaires 102 may include a user input sensor capable of detecting user activity related to user inputs without requiring physical contact of the user. Further, at least one of the intelligent luminaires 102 may include an output component that provides information output to the user.

Some of the intelligent luminaires 102 may not have user interface related elements. In the example of the light system 100, each of the intelligent luminaires 102a includes a light source 106, a communication interface 108 linked to the communication network 116, and a processor 110 coupled to control the light source 106 and to communicate via the communication interface. Such intelligent luminaires 102a may include lighting related sensors (not shown), such as occupancy sensors or ambient light color or level sensors; but the intelligent luminaires 102a do not include any user interface components for user input or for output to a user (other than control of the respective light source 106). The processors of the intelligent luminaires 102a are programmable to control lighting operations, for example, to control the light sources 106 of the intelligent luminaires 102a in response to commands received from the communication network 116 and the communication interfaces 108.

Other examples of the intelligent luminaires 102b, 102c, and 102d may include one or more user interface components. Although three examples are shown, it is envisaged that still other types of interface components or arrangements thereof in various intelligent lighting devices may be used in any particular implementation of a system like the light system 100. Any one intelligent luminaire that includes components to support the interactive user interface functionality of the light system 100 may include an input sensor type user interface component, an output type user interface component, or a combination of one or more input sensor type user interface components with one or more output type user interface components.

Each of some number of intelligent luminaires 102b at the premises 104 may include one or more sensors 126. The intelligent luminaires 102b can be in one or more rooms or other service areas at the premises 104. In the intelligent luminaires 102b, each of the sensors 126 is configured for detection of intensity of received light and to support associated signal processing to determine direction of incident light. A particular example of the sensor 126 that can be used as an input device for determining direction and intensity of incident light received by the sensor 126 is a quadrant hemispherical light detector or "QHD." The sensors 126 may detect light in some or all of the visible portion of the spectrum or in other wavelength bands, such as infrared (IR) or ultraviolet (UV). By using two or more such sensors 126 in the same or a different intelligent luminaire 102b illuminating the same service area, it is possible to detect position of an illuminated point or object in three-dimensional space relative to known positions of the sensors 126. By detecting position of one or more points over time, it becomes possible to track motion within the area illuminated by the intelligent luminaire(s) 102b and monitored for user input by the sensors 126, for example, as a gestural user input. Although two sensors 126 are shown on one intelligent luminaire 102b, there may be more sensors 126 or there may be a single sensor 126 in each intelligent luminaire 102b amongst some number of the intelligent luminaires 102b illuminating a particular service area of the premises 104.

In the example, at least one of the intelligent luminaires 102b also includes a lighting related sensor 127. Although shown in the intelligent luminaire 102b for purposes of discussion, such a sensor may be provided in any of the other intelligent luminaires 102, in addition or as an alternative to deployment of the sensor 127 in a lighting intelligent luminaire 102b. Examples of such lighting related sensors 127 include occupancy sensors, device output (level or color characteristic, which may include light color, light temperature, or both) sensors, and ambient light (level or color characteristic, which may include light temperature, or both) sensors. The sensor 127 may provide a condition input for general lighting control (e.g., to turn on or off the intelligent luminaires 102 or adjust outputs of the light sources 106). However, sensor input information from the sensor 127 also or alternatively may be used as another form of user input, for example, to refine detection and tracking operations responsive to signals from the sensors 126.

In an example of a user input related function, the signals from the sensors 126 in the intelligent luminaires 102b illuminating a particular room within the premises 104 are processed to detect gestures of one or more persons or users within the room. The lighting output from the light sources 106 of the devices 114 illuminating the area may be controlled responsive to the detection of one or more predetermined user input gestures. Although not shown, one or more of the intelligent luminaires 102b may also include a user output component, for example to provide an audio or video output of information to the person or persons in the room.

Such gesture input together with lighting control and other information output implement a form of interactive user interface. This interface related operation includes selectively controlling a lighting operation of at least some number of the lighting devices as a function of a processed user input. The interface related operation may also include either controlling a non-lighting-related function as a function of a processed user input, or an operation to obtain and provide information as a response to a user input as an output via the output component.

In the example of the light system 100, each of the intelligent luminaires 102c and one or more of the intelligent luminaires 102d in one or more rooms or other service areas of the premises 104 may support audio input and audio output for an audio based user interface functionality. Also, audio user interface components may be provided in other intelligent luminaires 102 that are different from those deploying the video user interface components. For convenience, the audio input and output components and the video input and output components are shown together in each of the intelligent luminaires 102c, one or more of which may be deployed with other lighting devices in some number of the services areas within premises 104.

In the example of FIG. 1, each intelligent luminaire 102c, one or more of the intelligent luminaires 102d, or a combination thereof includes an audio user input sensor such as a microphone 128. Any type of microphone capable of detecting audio user input activity, for example, for speech recognition of verbal commands or the like, may be used. Although the audio output may be provided in different devices 114, each of the intelligent luminaires 102c or 102d may include an audio output component such as one or more speakers 138 that provide information output to the user. Where the speaker 138 is provided, there may be a single speaker 138 or there may be a plurality of speakers 138 in each respective intelligent luminaire 102.

The audio input together with lighting control and audio information output implement an additional form of interactive user interface. The user interface related operation includes selectively controlling a lighting operation of at least some number of the intelligent luminaires 102 as a function of a processed user input. The interface related operation may also include either control of a non-lighting-related function as a function of a processed user input, or an operation to obtain and provide information as a response to a user input as an output via the output component. For example, a user audio input (e.g., a voice command) may be processed to control a non-lighting device 114 (e.g., an HVAC unit, a washer, a dryer, etc.) that is communicatively connected to the communication network 116. Further, the intelligent luminaires 102 may respond with audible information when the microphone 128 receives a user request for information (e.g., a weather update, movie show times, etc.).

In an example, a physical mechanism may be implemented to mute the microphones 128 of the intelligent luminaire 102 instead of implementing only a soft mute function (e.g., via software control) when the user would like privacy from the microphones 128 that may constantly be listening for a wake word. The physical mechanism may also be included on any other device with a microphone 128 that is constantly listening for a wake word. In other words, the microphones 128 may be muted using a mechanical or physical device rather than only a software routine. The hard mute design may incorporate a movable assembly into the intelligent luminaire 102 with components that physically (i.e., mechanically) create a temporary seal over any microphone porting holes of the microphone 128. The movable assembly can also activate an electro-mechanical or hall-effect switch that electrically disconnects the microphone signal paths for additional privacy and peace-of-mind.

A soft mute functionality of the microphone 128 may be performed simultaneously with the hard mute of the microphone 128 described above, or the soft mute functionality may be performed independently. The soft mute functionality is a software method that enables muting of the microphone 128 of the intelligent luminaire 102 remotely using a companion mobile application (e.g., on a mobile device or tablet). The soft mute functionality may preserve user privacy by enabling the user to mute voice assistant services of a virtual assistant enabled luminaire. In an example where the intelligent luminaire 102 is ceiling mounted and far away from the normal user, a hardware mute button may not be practical for an occupant of a room containing the intelligent luminaire 102. Using a software based mute button will provide a mechanism for the user to shut down the microphones 128 on the intelligent luminaire 102 to stop a voice service from listening to the user.

Implementing a software mute virtual button on a user interface of the mobile application may enable the user to press a button on the mobile application that results in the mobile device sending a mute command wirelessly to the intelligent luminaire 102. The mute command may instruct a microcontroller unit (MCU) to toggle a general-purpose input/output (GPIO) on a microphone switch circuit such that the GPIO removes a power supply from the microphones 128. Removing the power supply results in the microphone 128 being rendered non-operational until the GPIO is toggled again to reconnect the power supply with the microphone 128. For example, the GPIO may be toggled to reconnect the power supply upon receiving an unmute signal from the mobile device based on a user interaction with the mobile application, or the GPIO may be toggled upon automatically timing out the mute functionality after a specified amount of time. Removing the power supply from the microphone 128 functions in a similar manner to a hardware mute button except that the command from the user to the intelligent luminaire 102 is done remotely via wireless connection between the mobile application and the intelligent luminaire 102.

Although shown for illustration purposes in the intelligent luminaire 102c, image-based input and/or output components may be provided together or individually in any others of the intelligent luminaires 102 that may be appropriate for a particular installation. Although referred to at times as "video," the image-based input and/or output may utilize still image input or output or may use any appropriate form of motion video input or output. In the example of the light system 100, each of several of the intelligent luminaires 102d in one or more rooms of the premises 104 also supports image input and output for a visual user interface functionality.

For the visual user interface functionality an intelligent luminaire 102c includes at least one camera 140. The camera 140 could be a still image pickup device controlled to capture some number of images per second, or the camera 140 could be video camera. By using a number of cameras 140 to capture images of a given service area, it is possible to process the image data to detect and track user movement in the area, for example, to identify user input gestures. The multiple cameras 140 could be in a single intelligent luminaire 102c or could be provided individually in two or more of the lighting devices that illuminate a particular room or other service area. The image capture may also support identification of particular individuals. For example, individuals may be identified using facial recognition and associated customization of gesture recognition or user responsive system operations.

A visual output component in the intelligent luminaire 102c may be a projector 142, such as a pico projector. The visual output component may take other forms, such as an integral display as part of or in addition to the light source. The projector 142 can present information in a visual format, for example, as a projection on a table or a desk top or a wall or the floor. Although shown in the same intelligent luminaire 102c as the camera 140, the projector 142 may be in a different intelligent luminaire 102.

One or more of the processors 110 in the intelligent luminaires 102 are able to process user inputs detected by the user input sensor(s), such as the visual sensors 126, 128, 140, the microphone(s) 128, or a combination thereof. Other non-contact sensing technologies may also be used (e.g., ultrasound) instead of or in combination with the input sensors discussed above. The processing of sensed user inputs may relate to control operations of the intelligent luminaires in one or more areas of the premises 104. For example, the processing may detect spoken commands or relevant gestural inputs from a user to control the intelligent lighting devices in an area in which the user is located (e.g., to turn lights ON/OFF, to raise or lower lighting intensity, to change a color characteristic of the lighting, or a combination thereof).

In addition to lighting control functions, such as mentioned here by way of example, one or more of the processors 110 in the intelligent luminaires 102 may be able to process user inputs so as to enable the light system 100 to obtain and present requested information to a user at the premises 104. By way of an example of such additional operations, the light system 100 may also enable use of the intelligent luminaires 102 to form an interactive user interface portal for access to other resources at the premises 21 (e.g., on other non-lighting devices in other rooms at the premises) or enable access to outside network resources such as on the server 120 or a remote terminal 122 (e.g., via the WAN 118).

Any one or more of the intelligent luminaires 102 may include a sensor 144 for detecting operation of the light source 106 within the respective intelligent luminaire 102. The sensor 144 may sense a temperature of the light source 106 or sense other components of the intelligent luminaire 102. The sensor 144 may also sense an optical output of the light source 106 (e.g., a light intensity level or a color characteristic). The sensor 144 may provide feedback as to a state of the light source 106 or other component of the intelligent luminaire 102, which may be used as part of the general control of the intelligent luminaires 102.

The sensor 144 may also be a wireless or wired environmental monitoring element, and the intelligent luminaire 102 may include one or more of the sensors 144. Monitoring of environmental parameters using the intelligent luminaire 102 can provide information about the surrounding environment and the human occupancy status of a space where the intelligent luminaire 102 is installed. In some examples, the intelligent luminaire 102 may be referred to as a smart connected luminaire. The term "smart connected luminaire" may refer to a luminaire that is capable of communicating with other devices (e.g., environmental sensors, internet of things (IoT) devices, other luminaires, the internet, etc.). Further, the smart connected luminaire may be capable of receiving or sending signals from sensors or transducers of other IoT devices, processing the signals, and performing operations based on the processed signals.

In an example, the sensors 144 (e.g., detectors and sensors) may be integral within the intelligent luminaire 102, the sensors 144 may be wirelessly coupled to the intelligent luminaire 102, or the sensors 144 may be in wired communication with the intelligent luminaire 102. The sensors 144 provide environmental monitoring statuses to the intelligent luminaire 102. In turn, the intelligent luminaire 102 may provide the environmental monitoring statuses to a cloud computing service (e.g., at the server 120) for analytics. For example, the intelligent luminaire 102 may act as a wireless local area network (LAN) access point to all smart wireless LAN or Bluetooth capable detectors and sensors capable of connecting to the intelligent luminaire 102. In this manner, each detector or sensor may be monitored for its data, which may include and not be limited to temperature levels, light levels, gas detection, air quality detection, humidity levels, any other suitable statuses, or any combination thereof.

Additionally, the intelligent luminaire 102 may use voice activation services to monitor sound levels (e.g., using the microphone 128) in the environment surrounding the intelligent luminaire 102. By monitoring the sound levels, the intelligent luminaire 102 may be able to detect human presence and distinguish individual voices. The voice detection and distinction may be performed by training the intelligent luminaire 102 to detect and identify occupant voices using the luminaire microphone array (i.e., the microphone 128) that is used in the intelligent luminaire 102 for interacting with voice assistant voice services (e.g., Alexa® by Amazon Technologies, Inc., Google Now and Google Assistant by Google LLC, Cortana® by Microsoft Corporation, Siri® by Apple Inc., any other virtual assistant services, or any combination thereof).

The intelligent luminaire 102 may receive environmental health and monitoring data from any smart sensors 144 capable of communicating with the intelligent luminaire 102. The smart sensors 144 may include gas detectors, motion sensors, temperature and humidity sensors, light detectors, or any smart sensors capable of communicating with the intelligent luminaire 102. Industrial use sensors in communication with the smart collected light may collect machine sensor data in hazardous areas and process the data analytically. Additionally, preventative maintenance of industrial grade equipment may rely on outdoor or commercial space sensors in communication with the intelligent luminaire 102. Further, the intelligent luminaire 102 is able to provide the environmental monitoring data to a cloud computing service to pool and analyze the sensor data. The environmental monitoring detectors and sensors include but are not limited to: microphones; proximity sensors; cameras; LIDAR and SONAR; ultrasonic sensors; smoke and carbon monoxide detectors; temperature sensors; humidity sensors; barometric pressure sensors; light sensors; radios; Wi-Fi repeaters; or any other suitable detectors and sensors. These sensors may collect data that can be processed for functions that include but are not limited to: audio/video playback and alerts for sleep monitoring (e.g., a snoring monitor); audio/video playback and alerts for occupancy monitoring (e.g., baby monitors, nanny cams, elder care, etc.); alerts for smoke detection; alerts for carbon monoxide detection; alerts for security breaches; facial recognition; circadian rhythm monitoring; user occupancy detection; voice recognition; people counting; geofencing; temperature control based on room occupancy; lighting control based on room occupancy; temperature and lighting control based on received voice commands; any other suitable functions; or any combination thereof. Further, the sensors and functions may be used in residential environments, hotel environments, commercial environments, or any other environments. It may be expected that the intelligent luminaire 102 will act as a sensor hub that can source or synchronize environmental sensor data.

In the light system 100, the intelligent luminaires 102 incorporate the elements and provide processing to support an interactive user interface that does not require a user to touch or otherwise physically contact an element of the light system 100. The user also does not have to operate a separate device, such as a smartphone or other portable terminal device. The intelligent luminaires 102 implement the interactive user interface to the light system 100, and the user interacts with the light system 100 using the intelligent luminaires 102.

The light system 100 may also include or support communications for other elements or devices at the premises 104, some of which may offer alternative user interface capabilities instead of or in addition to the interactive user interface supported by the intelligent luminaires 102. For example, user interface elements of the light system 100 may be interconnected to the data communication network 116 of the light system 100. Standalone sensors of the lighting system may also be incorporated in the light system 100, where the standalone sensors are interconnected to the data communication network 116. At least some of the standalone sensors may perform sensing functions analogous to those of sensors 127 and 144.

The light system 100 may also support wireless communication to other types of equipment or devices at the premises 104 to allow the other equipment or devices to use the data communication network 116, to communicate with the intelligent luminaires 102, or both. By way of example, one or more of the intelligent luminaires 102 may include the wireless interface 124 for such a purpose. Although shown in the intelligent luminaire 102b, the wireless interface 124 may instead or in addition be provided in any of the other intelligent luminaires 102 in the light system 100. A wireless link offered by the wireless interface 124 enables the light system 100 to communicate with other user interface elements at the premises 104 that are not included within the intelligent luminaires 102. In an example, a remote control 146 may represent an additional input device operating as an interface element and a television or monitor 148 may represent an additional output device operating as an interface element. The wireless links to devices like the remote control 146 or the television or monitor 148 may be optical, sonic (e.g., speech), ultrasonic, or radio frequency, by way of a few examples.

In an example, the intelligent luminaires 102 are controllable with a wall switch accessory 150 in addition to direct voice control or gesture control provided to the intelligent luminaire 102, as discussed above. The wall switch accessory 150 wirelessly connects to the virtual assistant enabled luminaire or other compatible device using the wireless interface 125. The wireless connection between the wall switch accessory 150 and the intelligent luminaire 102 enables voice and manual control of the luminaire to extend the control range available to the luminaire.

A location of the intelligent luminaire 102 may create a situation where the intelligent luminaire 102 is too far from a user to detect audible commands from the user. Additionally, acoustic interference during speaker audio playback may prevent the intelligent luminaire 102 from detecting audio commands from the user. In one or more examples, the location of the intelligent luminaire 102 (e.g., in a ceiling) may not provide the user with physical access to interact with the device to overcome the distance and interference issues associated with detecting the audible commands from the user.

The wall switch accessory 150 extends many of the intelligent luminaire features and abilities through a wireless connection. The wall switch accessory 150 addresses the physical distance issue by replacing a set of microphones 128 contained in the intelligent luminaire 102 with a set of microphones 128 located at another location within the room. In another example, the wall switch accessory 150 addresses the physical distance issue by adding additional microphones 128 associated with the luminaire at the other location within the room. Further, the wall switch accessory 150 provides a mechanism for the user to press a physical button 152 to instruct the microphones in the wall switch accessory 150 to listen to a voice command.

In an example, the wall switch accessory may provide a voice stream received at the microphones 128 in the wall switch accessory 150 to the intelligent luminaire 102 through a Bluetooth connection. In another example, the wall switch accessory 150 may provide the voice stream to the luminaire through a shared cloud account using Wi-Fi. For example, the wall switch accessory 150 may provide the voice stream to a cloud account (e.g., a voice service cloud account) through a wireless router, and the cloud account processes the voice stream and provides a command or request associated with the voice stream to the intelligent luminaire 102. Other wireless communication protocols are also contemplated for the transmission of the voice stream to the intelligent luminaire 102.

The wall switch accessory 150 can also instruct the intelligent luminaire 102 to pause or mute audio playback while the voice commands are being communicated. In an example, the wall switch accessory 150 may have physical buttons (e.g., the button 152) to allow the user to control features of the intelligent luminaire 102 when the device is unreachable for direct physical interaction. The controllable features of the intelligent luminaire 102 may include increasing or decreasing a speaker volume of the luminaire, pausing or playing music playback through the speaker of the luminaire, muting a speaker output of the luminaire, muting the microphones of the luminaire and the wall switch accessory for privacy, increasing or decreasing a lamp brightness of the luminaire, changing a lamp color temperature of the luminaire, or turning off the lamp of the luminaire. The physical buttons of the wall switch accessory 150 capable of controlling the controllable features of the intelligent luminaire 102 may perform the control through Bluetooth connections, Wi-Fi connections, or any other suitable wireless communication connections.

Further, other devices may be used in place of the wall switch accessory 150. For example, the functionality of the wall switch accessory 150 may be integrated in a device that also controls non-lighting functions. Other functions of the intelligent luminaire 102 may also be provided remotely. For example, lights or other elements used for non-verbal communication may be incorporated as part of the wall switch accessory 150 or other devices that perform similar functions.

The intelligent luminaires 102, as discussed above and shown in the FIG. 1, may include user interface related components for audio and optical (including image) sensing of user input activities. The intelligent luminaire 102 also includes interface related components for audio and visual output to the user. These capabilities of the intelligent luminaires 102 and the light system 100 support an interactive user interface through the lighting devices to control lighting operations, to control other non-lighting operations at the premises, to provide a portal for information access (where the information obtained and provided to the user may come for other equipment at the premises 104 or from network communications with off-premises systems), or any combination thereof.

For example, the intelligent luminaire 102 or the light system 100 can provide a voice recognition/command type interface using the intelligent luminaire 102 and the data communication network 116 to obtain information, to access other applications or functions, etc. For example, a user at the premises 104 can ask for information such as a stock quote or for a weather forecast for the current location of the premises 104 or for a different location than the premises 104. The user can ask the system to check a calendar for meetings or appointments and can ask the system to schedule a meeting.

In an example, the speech may be detected and digitized in the intelligent luminaire 102 and is processed to determine that the intelligent luminaire 102 has received a command or a speech inquiry. For an inquiry, the intelligent luminaire 102 sends a parsed representation of the speech through the light system 100 (and possibly through the WAN 118) to the server 120 or to a processor within one of the intelligent luminaires 102 with full speech recognition capability. The server 120 identifies the words in the speech and initiates the appropriate action to obtain requested information from an appropriate source via the Internet or to initiate an action associated with the speech. The server 120 sends the information back to the intelligent luminaire 102 (or possibly to another device) with the appropriate output capability, for presentation to the user as an audible or visual output. Any necessary conversion of the information to speech may be done either at the server 120 or in the intelligent luminaire 102, depending on the processing capacity of the intelligent luminaire 102. As the processing capacity of lighting devices increases, some or all of the functions of the server in this example may be shifted into the lighting devices.

The intelligent luminaire 102 and the light system 100 may provide similar services in response to gestural inputs, detected via the sensors 126, one or more cameras 140, or a combination of sensors and cameras. Also, systems that include both audio and optical input components can respond to combinations of speech and gestural inputs. Systems that include both audio and video output components can present information to the user in various desirable combinations of audio and image or video outputs.

In an example, the intelligent luminaire 102 incorporates artificial intelligence of a virtual assistant. For example, the intelligent luminaire 102 may include functionality associated with voice assistants such as Alexa® by Amazon Technologies, Inc., Google Now and Google Assistant by Google LLC, Cortana® by Microsoft Corporation, Siri® by Apple Inc., any other virtual assistants, or any combination thereof. The virtual assistant enabled functionality of the intelligent luminaire 102 provides voice enabled control of the luminaire lighting features such as a correlated color temperature (CCT) output by the intelligent luminaire 102, lumens output by the intelligent luminaire 102, a configuration of the intelligent luminaire 102, operational modes of the intelligent luminaire 102 (e.g., environmental detection modes, occupancy detection modes, etc.), configuration of any other networked luminaires, any other luminaire lighting feature, or any combination thereof.

Further, in the intelligent luminaires 102 including the speakers 138, the virtual assistant enabled functionality of the intelligent luminaire 102 controls speaker features such as volume, bass, independent channel control, other speaker features, or any combination thereof. The speaker 138 within or associated with the intelligent luminaire 102 may be a speaker element that includes a single speaker or a multiple speaker arrangement. For example, the speaker 138 may be a coaxial loudspeaker with two or more drive units. In such an example, a tweeter may be mounted in front of a subwoofer, and the virtual assistant enabled functionality of the intelligent luminaire 102 is able to control speaker features of both the tweeter and the subwoofer. The speaker 138 may also be a midwoofer-tweeter-midwoofer (MTM) loudspeaker configuration. In the MTM configuration, the virtual assistant enabled intelligent luminaire 102 is able to control speaker features of all three of the drive units (i.e., drive units for the two midwoofers and the tweeter).

The speaker 138 of the intelligent luminaire 102 may be integrated with the intelligent luminaire 102 or be a modular sub-assembly that is capable of being added to or removed from the intelligent luminaire 102. The speaker 138 may include one or more cosmetic pieces to cover the speaker 138 such as a grill or cloth that is acoustically transparent. The cosmetic piece could also be highly reflective in addition to being acoustically transparent. Accordingly, the cosmetic pieces may be installed to balance aesthetic quality, acoustic quality, and light emission quality.

The virtual assistant enabled intelligent luminaire 102 may also include a lens with a beam shaping (e.g., optical distribution) functionality. The virtual assistant may provide control of the intelligent luminaire 102 to control the beam shaping functionality. A lighting element (e.g., the light source 106) of the intelligent luminaire 102 may be a backlight or a waveguide design. Further, the lighting element may be perforated in numerous different arrangements to optimize sound waves that are transmitted through the lighting element from a speaker 138 positioned behind the lighting element.

In an example, the intelligent luminaire 102 may provide a mechanism for non-verbal communication with a user via visual feedback controlled by the virtual assistant. The non-verbal communication may be achieved through accent lighting on a trim ring of the intelligent luminaire 102, or any other lighting features incorporated within the intelligent luminaire 102. For example, the virtual assistant may control the main lighting output of the intelligent luminaire 102 to change colors or change illumination patterns or levels to provide the non-verbal communication to an occupant of a room within the premises 104.

The intelligent luminaire 102 with audio functionality may visually mask audio producing elements (e.g., the speakers 138) with an acoustically transparent lens positioned on a side of the intelligent luminaire 102 facing a room or other area of the premises 104 that is illuminated by the intelligent luminaire 102. For example, it may be desirable to incorporate the speaker 138 within the intelligent luminaire 102 to provide hidden audio within the premises 104. The presently disclosed subject matter includes multiple ways to improve the look of the speaker 138 and light source 106 of a luminaire (e.g., the intelligent luminaire 102) while allowing for airflow of the speaker 138 to produce satisfactory audio.

In an example, the intelligent luminaire 102, or a set of intelligent luminaires 102, may provide location based services. For example, indoor user positioning may involve a number of location sensing technologies that combine various methods to detect a user location indoors. While GPS is typically limited to functioning outdoors, indoor positioning may be needed to estimate user positions during emergency scenarios and while trying to place user locations indoors accurately on a facility map.

The intelligent luminaires 102 that are equipped with virtual assistant voice services (e.g., Alexa® by Amazon Technologies, Inc., Google Now and Google Assistant by Google LLC, Cortana® by Microsoft Corporation, Siri® by Apple Inc., any other virtual assistant services, or any combination thereof) can be used to provide coarse indoor user positions while a user is invoking the intelligent luminaire 102 to execute voice service commands. Other indoor positioning technologies may also be deployed that rely heavily on a radio frequency signature map or trilateration techniques using radio frequency signal strengths. The presently disclosed subject matter leverages audio sniffing capabilities (e.g., listening for wake words) of the intelligent luminaires 102 that support virtual assistant voice services to be able to detect a specific user and provide the specific user with the user's present location in accordance with a previously surveyed virtual assistant voice service enabled intelligent luminaire 102.

The intelligent luminaire 102 may provide a method of proximity detection. The method of proximity detection may calculate user location coordinates based on detecting a specific user according to a voice profile or voice signature of the specific user. The intelligent luminaire 102 may support voice assistant services and also support a voice recognition engine. Multiple microphone arrays (e.g., the microphones 128) may be deployed in one or more intelligent luminaires 102 to detect user voice profiles and execute voice commands according to various voice service platforms. In an example, a user voice signature or profile is detected and recognized after being compared to a stored voice signature or profile of the user. Upon detection, the smart connected luminaire is able to provide coarse coordinates of a location of the user to a location server. The coarse coordinates are based on coordinates associated with the intelligent luminaire 102 and the ability to detect the user voice only within a specific distance from the intelligent luminaire 102 (e.g., within a 10 or 15 foot radius). Thus, the coarse coordinates are accurate to within that distance.

In an example, the intelligent luminaire 102 may know its own coordinates (e.g., a location within a room in which the intelligent luminaire 102 is installed), and the intelligent luminaire 102 provides an indication of the coordinates to the location server when identifying and locating a user. In another example, the intelligent luminaire 102 does not know its own coordinates, and the intelligent luminaire 102 provides an indication of its identifier to the location server. In such an example, the location server assigns the coarse coordinates to the user based on the identifier of the intelligent luminaire 102 and the known coordinates of the individual intelligent luminaires 102 stored at the location server. In one or more examples, the cameras 140 may work in conjunction with the intelligent luminaires 102 to provide even more precision to the coarse coordinates. For example, the cameras can detect a specific position of the user within a room after the intelligent luminaire 102 has identified the room in which the user is located.

In one or more examples, the intelligent luminaire 102 may provide Voice over Internet Protocol (VoIP) services. Office conference rooms may include table top conference bridge systems. The conference bridge systems include deficiencies such as: consuming table top space; no "smart" capabilities (e.g., no ability to connect or communicate with other devices or networks); inability to store contact lists; difficulty associated with dialing numbers through a touch panel; and poor sound quality at certain table positions. Similarly, home phones include deficiencies such as: difficulty associated with storing contact lists; insufficient sound volume (e.g., suitable for a single person or a small group); or insufficient microphone capabilities.

The intelligent luminaire 102, or a set of intelligent luminaires 102, with the built-in microphone array (e.g., the microphone 128), the speaker 138, Wi-Fi connectivity, voice control capability, and mobile application compatibility can provide VoIP services. The VoIP service may be provided by the intelligent luminaire 102 by creating an account with a VoIP service provider, such as Google Voice, or by linking the intelligent luminaire 102 with other VoIP applications, such as Skype. Dial, answer, and decline functions of the VoIP service may be realized through a mobile application capable of controlling operations of the intelligent luminaire 102 or through voice commands provided to the intelligent luminaire 102. A contact list may be created in the mobile application or synched with an existing phone contact list. The intelligent luminaire 102 may be installed in the ceiling of an office conference room to save table space. Further, the intelligent luminaire 102 may enhance a user experience and user interface through the use of high configuration hardware (e.g., smart phones or tablets) and provide enhanced sound quality utilizing better speakers 138 and overhead sound transmission.

In an example, the intelligent luminaire 102 may include a selectable power-on light level scheme. The intelligent luminaire 102 (e.g., lamps or luminaires) may include a function that enables a light output to be turned off through a voice command or through a mobile application in addition to a wall switch. When an input power to the intelligent luminaire 102 resets due to a power outage, the intelligent luminaire 102 may include a recovery setting from a power outage state. In an example, an uncertainty of the recovery setting may cause inconvenience, frustration, and confusion to the user when the input power is removed and returned at undesirable times.

For example, if the intelligent luminaire 102 is designed to turn on when the input power is reset, then the user may be woken up in the middle of the night upon reestablishing power after the power outage. On the other hand, if the intelligent luminaire 102 is designed to maintain its previous state from before the power outage, a new user (e.g., a visitor) who is not familiar with the operation of the intelligent luminaire 102 will not be able to turn on the light without using the voice command or mobile application when the state before the power outage was off.

To address these issues, the intelligent luminaire 102 may include a selectable power-on light level scheme that enables the user to select or program the luminaire behavior modes upon resolution of a power outage. These modes may include but are not limited to: 1. a previous state; 2. a default state 1; 3. a default state 2; 4. a previous state before "OFF"; 5. a custom state. In one or more examples, different intelligent luminaires 102 may be programmed to different luminaire behavior modes. Further, the luminaire behavior modes may be programmed based on the cause of the power cycle. For example, if the power cycle is due to a power outage, the mode may be one of the default states. However, if the power cycle is due to a user's action, the mode may be the previous state before the power cycle. Moreover, the luminaire behavior modes may be programmed based on time of day. For example, a luminaire 102 experiencing a power outage that occurs at 2 a.m. may be programmed to remain off upon resolution of the power outage. In another example, a luminaire 102 experiencing a power outage that occurs at 7 p.m. may be programmed to return to a most recent state before the power outage.

Further, the intelligent luminaire 102 may include a system for updating software and firmware of the intelligent luminaire 102 using an over the air (OTA) scheme. In an example, the intelligent luminaire 102 provides a mechanism (e.g., the communications interface 108) for an OTA interface to a single-board computer (SBC) or main printed circuit board (PCB) of the intelligent luminaire 102 to communicate firmware updates to the processor 110 of the intelligent luminaire 102 without loading microcontroller unit (MCU) firmware separately. For example, using a specific test fixture, the SBC may pass through MCU firmware to the MCU using the OTA interface. The MCU firmware may be updated over the air similar to other devices or module firmware, such as the Wi-Fi module firmware or the SBC processor software. A UART communication and flash memory may be used to facilitate transfer of the MCU firmware from the SBC to the MCU. Further, this process may occur between the SBC and any non-volatile block of the intelligent luminaire 102.

Figure 2:
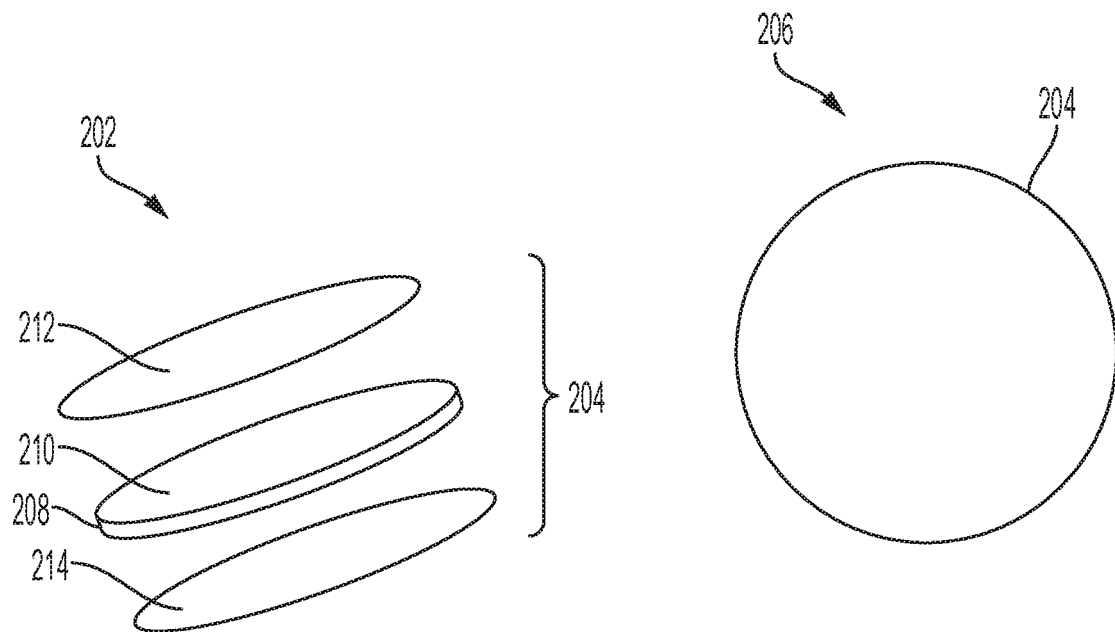
FIG. 2 depicts an exploded perspective view and an underside view of a light guide assembly, according to certain aspects of the present disclosure.

FIG. 2 is an exploded perspective view 202 of a light guide assembly 204 and an underside view 206 of the light guide assembly 204. The light guide assembly 204 may distribute light from the light sources 106 of a luminaire into a space surrounding the luminaire. The light sources 106 may include LEDs that feed light into an edge 208 of a light guide panel 210. The light guide assembly 204 may have elements that extract light from the edge 208 of the light guide assembly and direct the light out of the luminaire 102. In some examples, a reflective surface 212 is positioned behind a rear surface of the light guide panel 210 to reflect light that would normally be lost into a rear portion of a luminaire housing. The reflective surface 212 may instead direct the light through the light guide panel 210 and out of the luminaire. In one or more examples, a diffuser element 214 may be placed on a side of the light guide panel 210 that faces out of the luminaire to provide additional smoothing and evenness of the light or change the resulting luminaire distribution. The light guide assembly 204 may be described as an optical stack. In the depicted light guide assembly 204, a topmost component (i.e., the reflective surface 212) is a topmost element of the light guide assembly 204 within in the luminaire 102. The diffuser element 214 is a bottommost component of the light guide assembly 204 and is closest to a room side of the luminaire 102, and the light guide panel 210 is positioned between the reflective surface 212 and the diffuser element 214.

All three of the light guide panel 210, the reflective surface 212, and the diffuser element 214 may not be included in some examples of the light guide assembly 204. For example, the light guide assembly 204 may still function adequately without the reflective surface 212, without the diffuser element 214, or both.

In an example, a luminaire 102 may be able to provide visual feedback to a user of the luminaire 102 (e.g., an occupant of a room) through the same light emitting region of the luminaire 102 that provides general illumination. For example, through the light guide assembly 204.

Providing visual feedback from a luminaire 102, whether a stagnant indicator showing a current status of some product feature or as a direct response to a user command (e.g., audible, through a mobile application, or through some other remote control device), may be accomplished in one of several ways. In a luminaire 102 with a speaker incorporated in the center of the light emitting area (e.g., in the center of the light guide assembly 204), status LEDs may be placed within a speaker grille such that the status LEDs can be viewed directly by the user to provide visual feedback response.

In an example, the light guide assembly 204 is used to provide the visual feedback. The light guide assembly 204 includes the generally flat light guide panel 210 capable of extracting light from of the edge 208 of the light guide panel 210 such that the light exits out of a bottom of the luminaire 102. An array of general illumination LEDs may be positioned around the edge 208 of the light guide panel 210 if the light guide assembly 204 is round or along at least one edge of the light guide panel 210 if the light guide assembly 204 is square. The general illumination LEDs may provide the lighting for the light guide assembly 204 to extract into the room.

Figure 3:
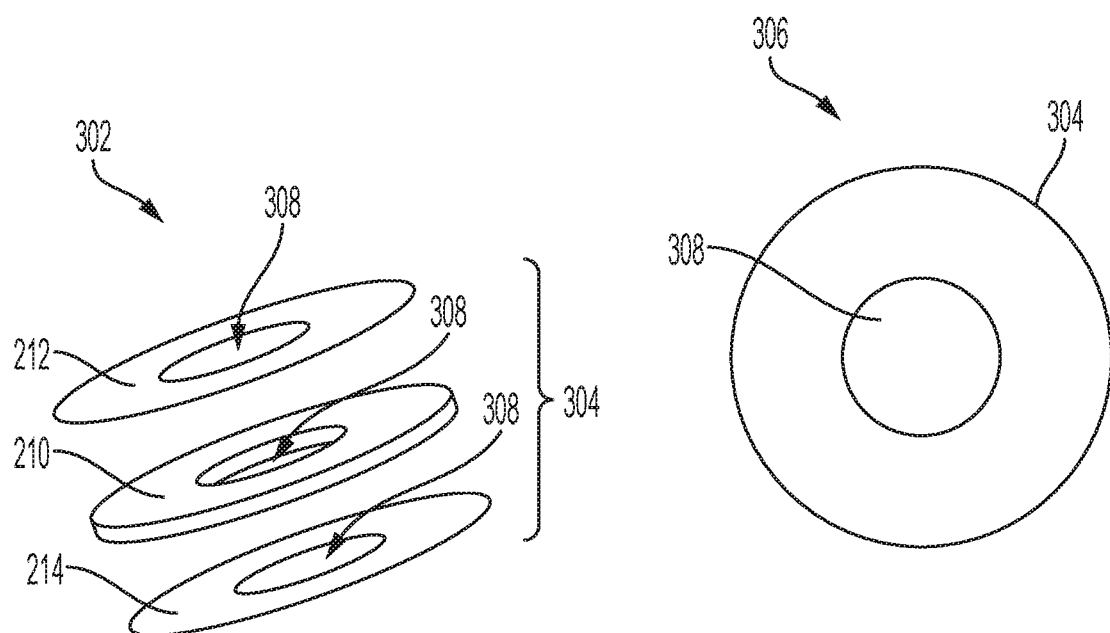
FIG. 3 depicts an exploded perspective view and an underside view of an additional light guide assembly, according to certain aspects of the present disclosure.

FIG. 3 is an exploded perspective view 302 of an additional light guide assembly 304 and an underside view 306 of the light guide assembly 304. For the speaker 138 to perform adequately, a hole 308 at least the size of a speaker diaphragm is cut in the light guide panel 210, the reflective surface 212, and the diffuser element 214. The hole 308 allows for the diaphragm to vibrate unimpeded, but the bare speaker 138 may be visible from the room through the hole 308. Speaker visibility in a central portion of the luminaire may greatly reduce the optical efficiency and visual aesthetic of the luminaire system.

Figure 4:
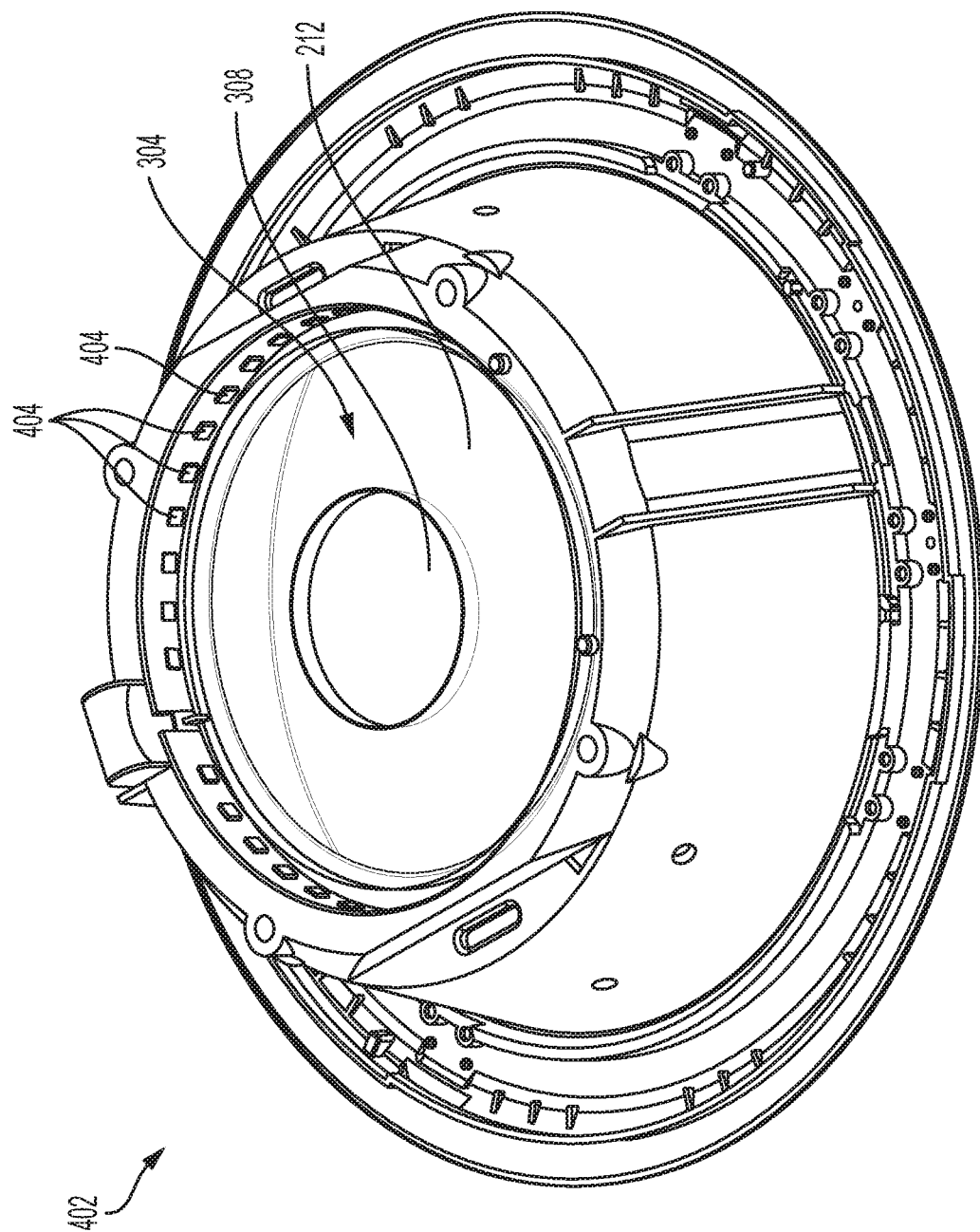
FIG. 4 depicts a perspective view of a luminaire housing including the light guide assembly of FIG. 3, according to certain aspects of the present disclosure.

FIG. 4 is a perspective view of a luminaire housing 402 including the light guide assembly 304. The speaker 138, as described above with respect to FIG. 1, may be mounted such that the speaker 138 is centered within the hole 308 of the light guide assembly 304. The reflective surface 212 of the light guide assembly 304, if used, is the side of the light guide assembly 304 depicted in FIG. 4. In an example, LEDs 404, which may be the light source 106 of the luminaire housing 402, may be positioned around an edge of the light guide assembly 304 to facilitate transmission of light into the light guide assembly 304.

Figure 5:
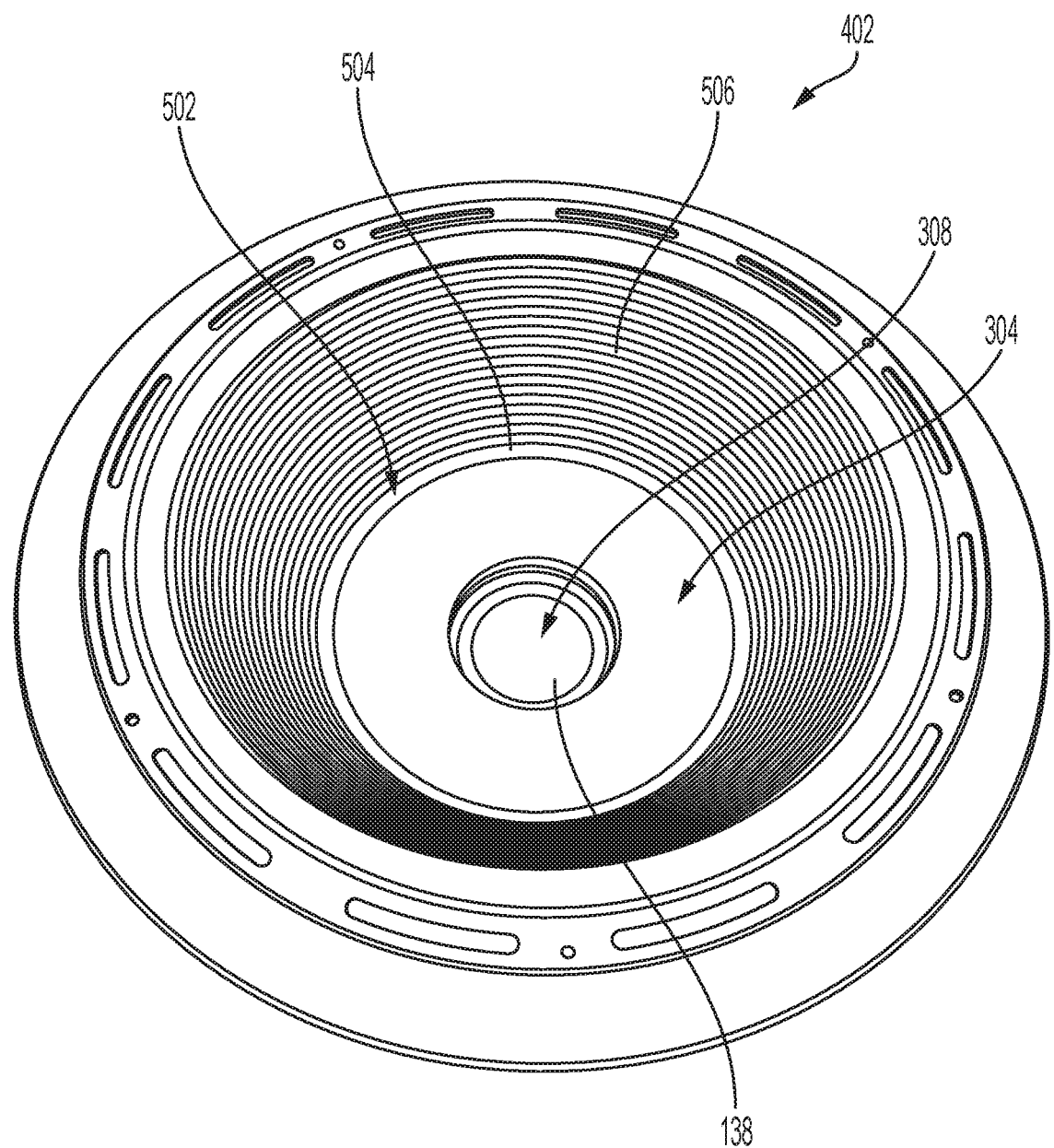
FIG. 5 depicts a perspective view of the luminaire housing of FIG. 4 including the light guide assembly of FIG. 3 from a room side of the luminaire housing, according to certain aspects of the present disclosure.

FIG. 5 is a perspective view of the luminaire housing 402 including the light guide assembly 304 from a room side of the luminaire housing 402. The depicted light guide assembly 304 includes the hole 308 cut from the light guide assembly 304 for the speaker 138 to be positioned on an opposite side of the light guide assembly 304.

In an example, the luminaire 102 may include the light guide assembly 204 or 304 including the round light guide 210, the rear reflective surface 212, the front diffuser element 214, and general illumination LEDs 404 positioned around the edge of the light guide as described above with respect to FIGS. 2-4. In some examples, some of the light guide elements may not be included and the hole 308 in the center of the light guide assembly 304 may not be included (e.g., as in the light guide assembly 204).

General illumination may be provided in the luminaire housing 402 through a series of the LEDs 404 positioned around the edge of the light guide assembly 304. In one or more examples, LEDs intended to provide visual feedback can be positioned next to or between the general illumination LEDs 404 such that the light guide assembly 304 itself is used as a visual feedback element. In this example, whenever visual feedback is provided, the visual feedback LEDs fire into the light guide assembly 304. Depending on desired aesthetics this may result in several different appearances.

For example, the visual feedback LEDs may be positioned to provide a more intense ring of visual feedback light around the edge of the light guide assembly 304. This greater intensity ring may minimally affect a color of the general illumination light while providing feedback that is visible at the edge of the light guide assembly 304. The same effect may be achieved by offsetting the visual feedback LEDs in a position toward the reflector rather than down toward the diffuser (e.g., positioned on a separate lighting plane that is further from an illuminated space than the general illumination LEDs 404).

In another example, it may be desirable to have the entire light guide assembly 304 uniformly illuminate with visual feedback just as when the general illumination LEDs 404 uniformly illuminate the light guide under general illumination operation. This example may have the effect of controlling the entire light guide assembly 304 to illuminate uniformly with the visual feedback and may result in tinting a color of the general illumination light to aid in providing the visual feedback by activating colored visual feedback LEDs. It may also be desirable to then dim the general illumination LEDs 404 to enable the visual feedback signal to be more readily visible in the light guide assembly 304 or in a primary illumination beam.

In an additional example, the general illumination LEDs 404 that are positioned around the light guide assembly 304 to provide general illumination may also be the visual feedback LEDs. Such an example may provide visual feedback in multiple ways. When the LEDs 404 are generally white LEDs, the feedback may be performed through pulsing the LEDs 404, dimming the LEDs 404, brightening the LEDs 404, or a combination thereof to provide the visual feedback. If the LEDs 404 are a combination of individual colors, such as RGB sets of LEDs 404, which are mixed to create white light for general illumination, then the colored LEDs 404 may be controlled to provide the visual feedback through coloring a light output of the light guide assembly 304 to various visual effects.

In another example, the visual feedback elements can be installed in the immediate vicinity of the light guide assembly 304 but not use the light guide assembly elements (e.g., the light guide panel 210, the reflective surface 212, and the diffuser element 214) to provide the visual feedback. In one example, the visual feedback is provided on a room side of the diffuser element 214 of the light guide assembly 304. This location is depicted as a ring 504 that appears between the outside edge of the light guide assembly 304 and a baffle 506. In such an example, the ring 504 may include an opaque, translucent ring that matches an appearance of the baffle 506 during normal operation. A series of visual feedback LEDs may be positioned to fire into or through the ring 504 such that when visual feedback is provided, the ring 504 glows or visual feedback chases around an edge of the ring 504 in various patterns to provide the desired feedback.

In a similar example, the visual feedback elements may be placed behind the light guide assembly 304. The visual feedback elements may be positioned at the edge of the light guide assembly 304 and fire through the light guide panel 210 to provide visual feedback that appears generally at the edge of the light guide assembly 210. An array of LEDs may also be positioned across the entirety of a rear of the light guide assembly 304 (e.g., without a reflective surface 212). This may produce even more visually different feedback patterns that may include creating images or patterns on a face of the light guide assembly 304 to provide additional feedback information.

An additional example may be specific to a luminaire 102 with the speaker 138 located in the center or rear of the light guide assembly 304. In such an example, the visual feedback elements may be located behind the light guide assembly 304, and the visual feedback elements may be used in any holes cut for the speaker 138 through the light guide assembly 304 to provide the visual feedback. As illustrated in FIG. 5, the visual feedback elements could fire into the hole 308 in the light guide assembly 304 where the speaker 138 is mounted such that the hole 308 appears to change colors to provide the visual feedback.

Figure 6:
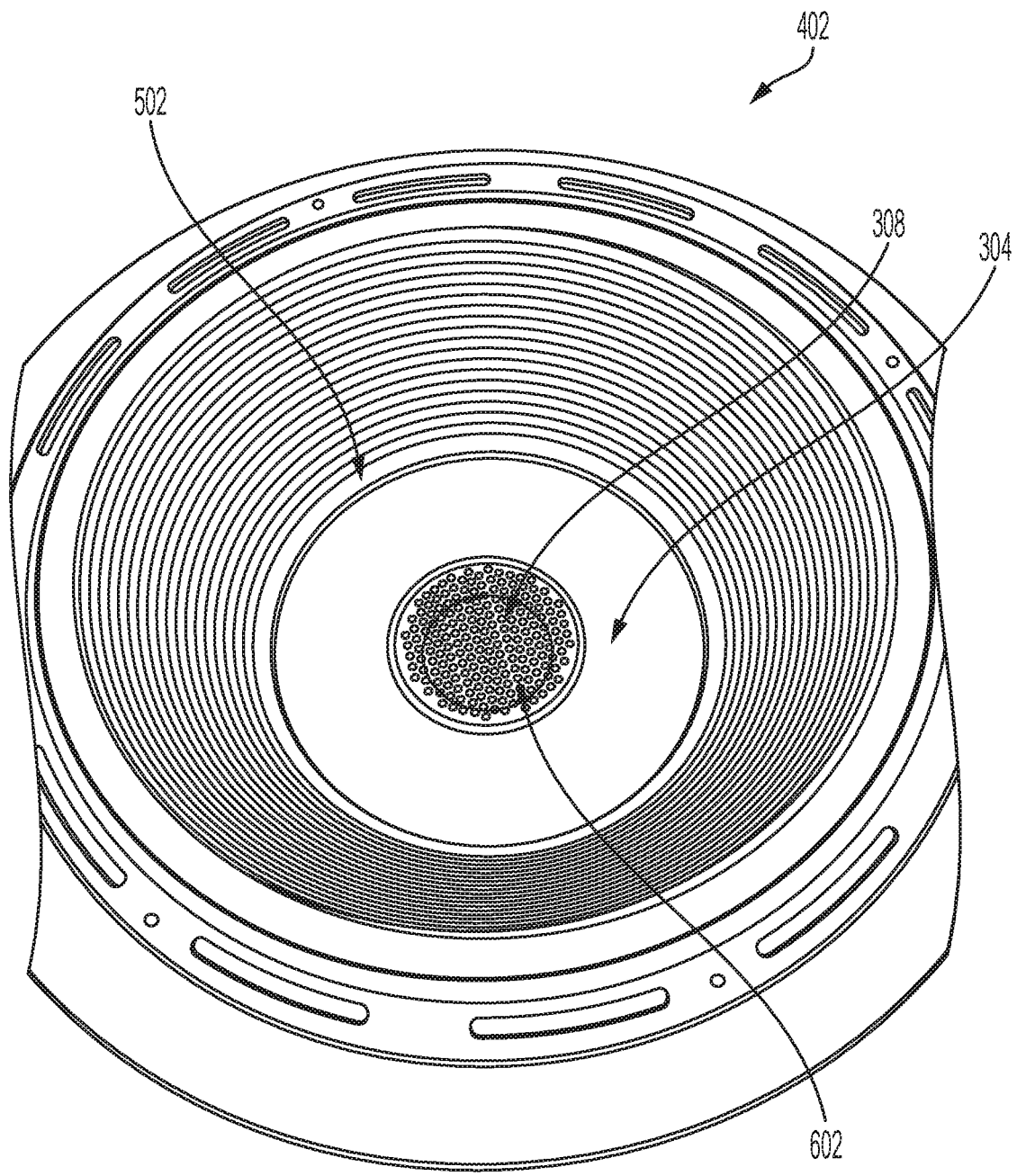
FIG. 6 depicts a perspective view of the luminaire housing of FIG. 4 including the light guide assembly of FIG. 3 and a reflective material positioned over a hole of the light guide assembly, according to certain aspects of the present disclosure.

FIG. 6 is a perspective view of the luminaire housing 402 including the light guide assembly 304 and a reflective element 602 positioned over the hole 308 of the light guide assembly 304. The reflective element 602 may include many small holes cut into a reflective material, and the reflective element 602 may be placed over the hole 308 of the light guide assembly 212. The small holes of the reflective element 602 are positioned over the hole 308 in the light guide assembly 304. The size of the holes in the reflective element 602 may be related to a thickness of the reflective element 602, and a sufficient number of holes may be added such that the speaker 138 is able to function properly (e.g., to allow a sufficient amount of air to flow in response to an audio output of the speaker 138). In an example, the number of holes in the reflective element 602 may be determined to leave an amount of the reflective material capable of reflecting a sufficient amount of light from the light source 106 to create a uniform appearance at a light guide plane (e.g., a plane of the lens area 502) while maintaining optical efficiency.

An example of operating visual feedback elements involves providing the visual feedback elements in or otherwise behind a pattern of center holes of the reflective element 602 that are present to hide the presence of speaker 138. In this example, the visual feedback elements may be positioned in or behind one of the center holes of the pattern to provide the visual feedback. The center hole may glow uniformly or with some other desirable pattern using the visual feedback elements to provide the visual feedback.

Additional ways to provide general illumination in a luminaire 102 while providing visual feedback at or near the light emitting surface include providing the visual feedback when no speaker 138 is present in the luminaire 102 and one or more LEDs are located some distance away from the diffuser element 214 of the light guide assembly 204 (i.e., a light guide assembly without the hole 308). In such an example, the LEDs 404 fire through the light guide assembly 204 to provide downlight. In this example, visual feedback LEDs may also be provided at a similar location as the general illumination LEDs 404, or the visual feedback LEDs may be positioned much closer to the diffuser element 214 of the light guide assembly 204 to improve the appearance or visibility of the visual feedback LEDs through the light guide assembly 204. In a similar luminaire 102 where the speaker 132 is present, the speaker 132 is located in the middle of the LED array and the light guide assembly 304. In a similar manner, the visual feedback LEDs can be placed in the same plane as the general illumination LEDs 404, or the visual feedback LEDs may be placed closer to the diffuser plane of the diffuser element 214 to improve the appearance or visibility of the visual feedback LEDs.

In an example, the general illumination LEDs 404 and the visual feedback LEDs are controlled using the same light engine. Additionally, multiple channels may control the general illumination LEDs 404 and multiple additional channels may control the visual feedback LEDs. While the examples are described using general illumination LEDs and visual feedback LEDs, other lighting sources may also be used in place of the LEDs.

Figure 7:
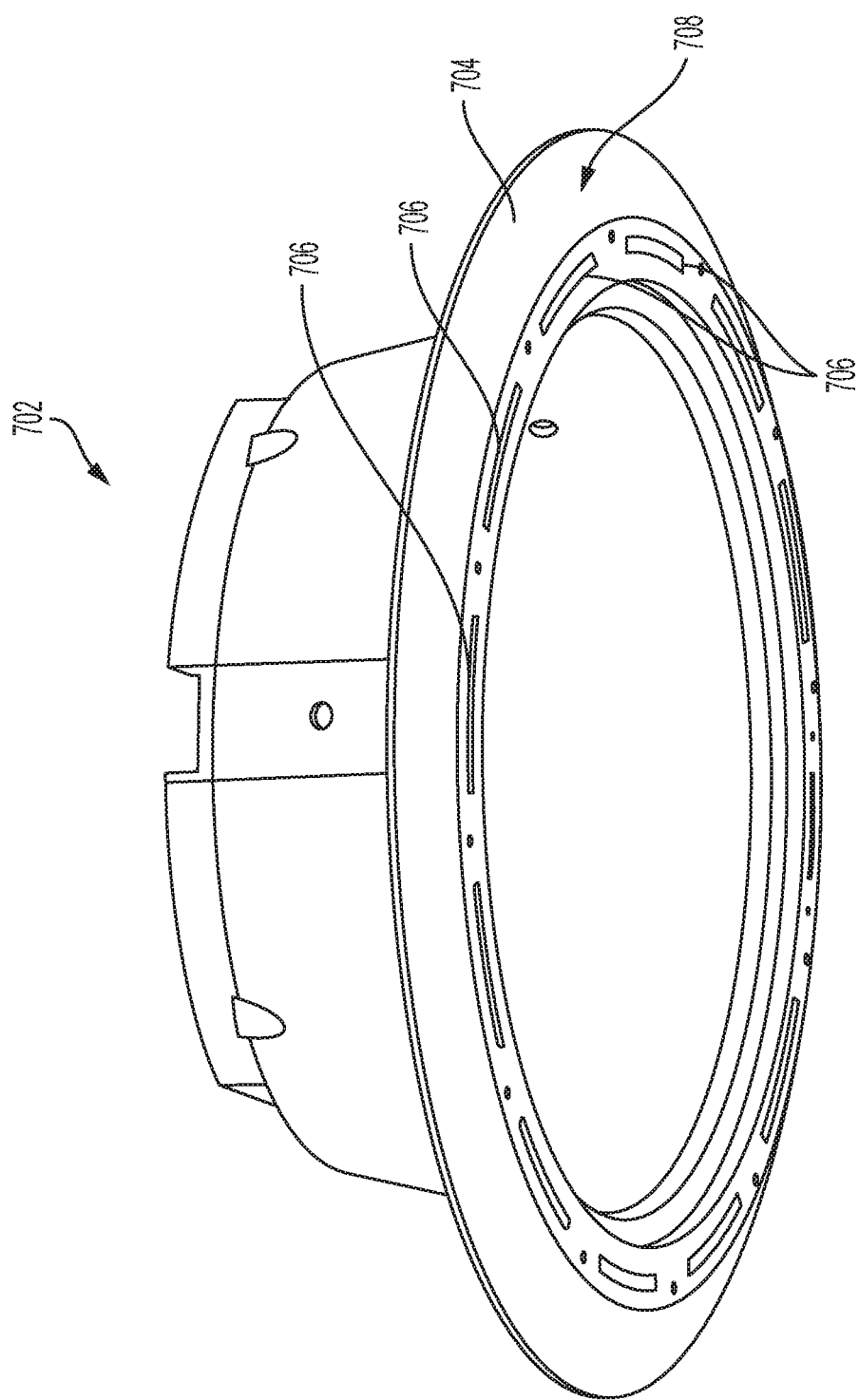
FIG. 7 depicts a perspective view of a luminaire housing including visual feedback from a trim component, according to certain aspects of the present disclosure.

FIG. 7 depicts a perspective view of a luminaire housing 702 including visual feedback from a trim component 704. In an example, the trim component 704 of the luminaire housing 702 may be capable of providing visual feedback to a user of the luminaire (e.g., an occupant of a room). The trim component 704 may appear to the user to be standard trim for a luminaire 102. When a command is issued to the luminaire 102 (e.g., a voice command from a user or a lighting control command from another device), a portion of the trim component 704 may be illuminated to indicate that the command was received, or the portion of the trim component 704 may be illuminated as a response of the luminaire 102 to the command.

The trim component 704 of the luminaire housing 702 provides a decorative finish to cover a mounting means (e.g., edges of a hole in the ceiling surrounding a can of the luminaire 102) for the luminaire 102 and to provide an acceptable aesthetic when transitioning between the luminaire and a ceiling surface. In many instances the goal of the trim component 704 is to make a transition between the luminaire 102 and the surrounding ceiling less noticeable. In some instances it is desirable for the trim component 704 to have a contrast to the ceiling so that the trim component 704 stands out. In either instance, the trim component 704 may include a symmetric and uninterrupted appearance around a face 708 of the trim component 704.

The trim component 704 may provide a visual feedback response in a trim level of the luminaire 102. Providing the visual feedback response at a trim level has many benefits. For example, a viewing angle of the visual feedback response from the luminaire 102 may be much wider than a feedback element located within a recessed can of the luminaire 102. Further, the visual feedback response is viewable from nearly anywhere in a space in which the trim component 704 itself is visible. Also, because the trim component 704 is generally not in a path of a light output from the luminaire 102, the brightness at the trim component 704 is generally much lower. Accordingly, the visual feedback response provided in the trim component 704 may be much more apparent and easier to receive and interpret by the user.

In an example, providing the visual feedback response to a room occupant may include placing light source elements 706 capable of providing the visual feedback response around a face 708 of the trim component 704. This example may involve providing cutouts and clearance directly into the trim component 704 for LEDs or other visual feedback response indicators to pass through the trim to be viewable by the user. The illustrated example involves elongating or shaping the cutouts in the trim component 704 and using light pipe elements as the light source elements 706 to transmit light from one or more visual feedback indicators in a manner that creates a smooth and uniform light emitting surface. The light pipe elements provide large visual feedback response regions that generally extend around the trim component 704 to create a uniform and consistent light output for the user. In another example, the only a single light source element 706 may be included within the luminaire housing 702, or one or more light source elements 706 may be included within the luminaire housing 702 in a pattern that is non-circular. For example, the luminaire housing 702 may include one or more light source elements 706 arranged in a linear (e.g., pendent) or area (e.g., troffer) light fixture housing.

Figure 8:
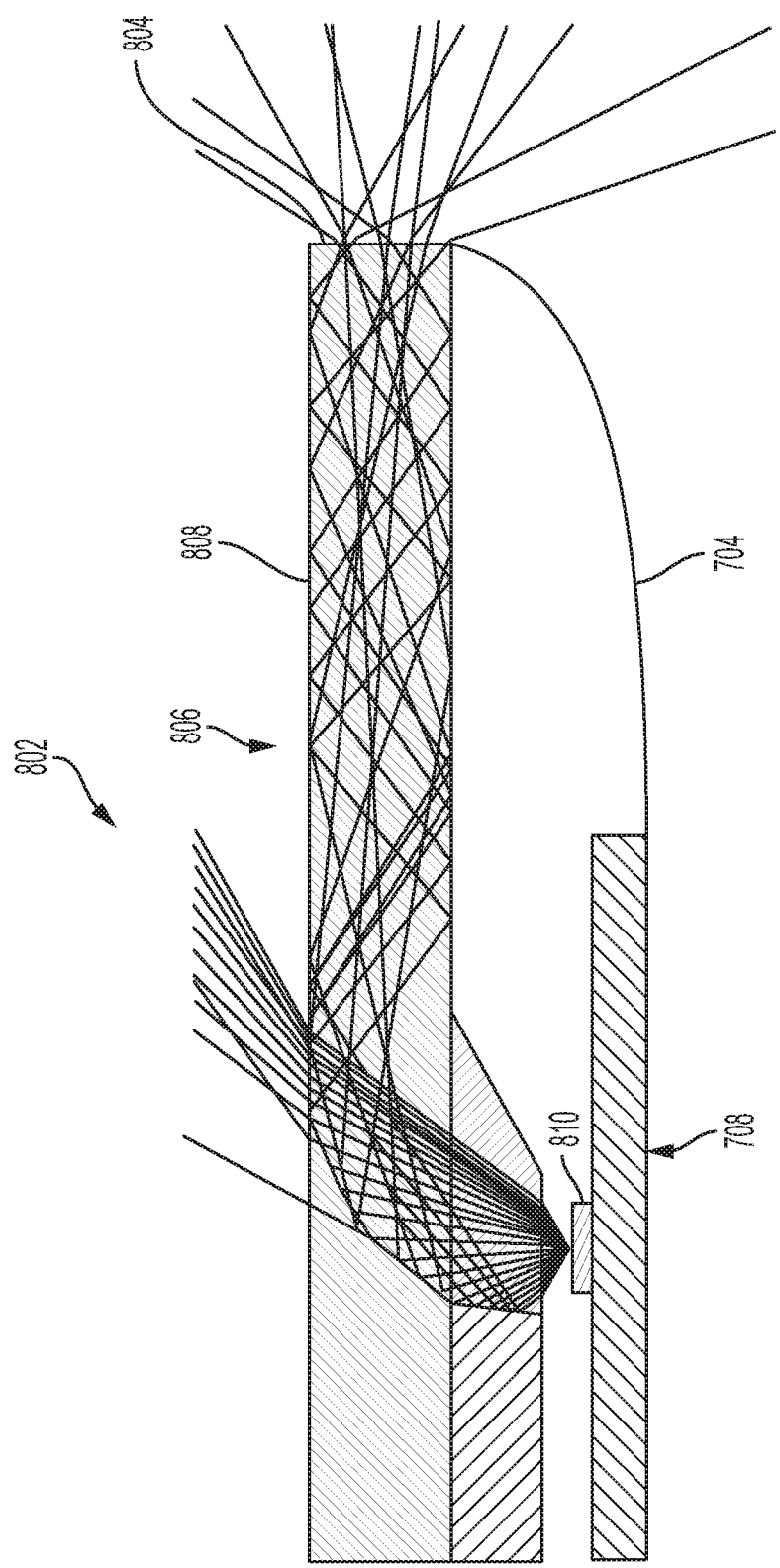
FIG. 8 depicts a sectional view of an example of a visual feedback response mechanism, according to certain aspects of the present disclosure.

FIG. 8 is a sectional view of an example of a visual feedback response mechanism 802. The visual feedback response mechanism 802 involves moving the visual feedback response areas seen by the user from the face 708 of the trim component 704 out to an edge 804 of the trim component 704 at or near a ceiling plane 806. This arrangement may be accomplished through the use of a light pipe element 808 that receives light from a visual feedback response source 810 and directs or pipes the light radially outward toward the edge 804 of the trim component 704. This may be performed through a solid light pipe element (e.g., with total internal reflection (TIR) and/or reflective surfaces) or through a hollow reflective element.

The light pipe element 808 is depicted as a TIR light pipe element, but an entire TIR surface, or at least portions of the TIR surface, may include an added reflective surface (e.g., a metalized finish) to help boost overall efficiency and/or to mask off stray light. The light pipe element 808 may be positioned between the ceiling plane 806 and the trim component 704. To reduce a gap between the trim component 704 and the ceiling plane 806, or to maintain a constant appearance between a luminaire 102 with visual feedback response elements and those that do not include the visual feedback response elements, the trim component 704 may be modified (e.g., essentially shortened), and the edge 804 of the light pipe element 808 may be shaped to match a portion of the trim component 704 that was removed to make up for a thickness of the light pipe element 808. The edge 804 of the light pipe element 808 may be clear or textured.

In another example, the edge 804 of the light pipe element 808 may appear generally opaque or color matched when not transmitting light to match the general appearance of an unmodified trim component 704 that has no visual feedback response elements. When a visual feedback response is activated at the luminaire 102, the light is piped through to the edge 804 of the trim component 704 such that the trim component 704 glows uniformly and uninterrupted around its entirety. In another example, if desired, the visual feedback response sources 810 may be fired in sequence around the trim to create a chase effect or other type of pattern. The chase effect may appear more uniform and smooth than if a similar segmented chase effect was provided because the light pipe element 808 may be continuous around the edge of the trim component 704 of the luminaire housing 402.

Figure 9:
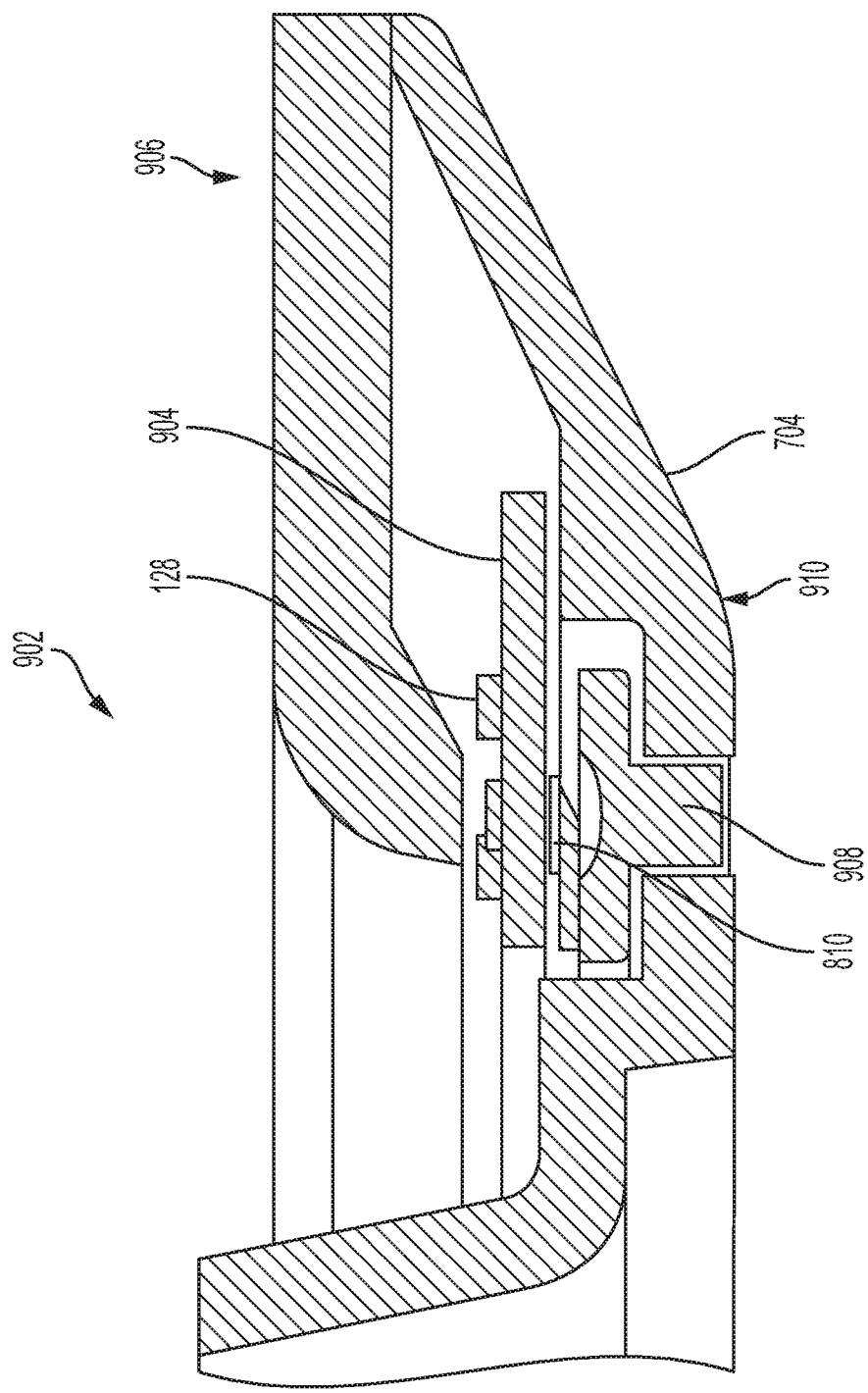
FIG. 9 depicts a sectional view of an example of a visual feedback response mechanism, according to certain aspects of the present disclosure.

FIG. 9 is a sectional view of an additional example of a visual feedback response mechanism 902. As illustrated, the trim component 704 includes a printed circuit board (PCB) 904 mounted within the trim component 704. In an example, the electronic components (e.g., the PCB 904) and the visual feedback response sources 810 (e.g., LEDs) for the visual feedback response are all mounted at a level beneath a plane 906 of the ceiling surface. In operation, the PCB 904 functions as a control circuit for the visual feedback response sources 810. The PCB 904 may include LED lights (e.g., the visual feedback response sources 810) used to provide the visual feedback response to the trim component 704. The PCB 904 may also include a microphone 128 used to provide voice commands to a virtual assistant enabled luminaire 102, and the PCB 904 may include any other devices or sensors that may operate in conjunction with the virtual assistant enabled luminaire 102. When a visual feedback response is provided to an occupant of a room, an LED on the PCB 904 provides light into a light pipe 908 positioned within the trim component 704. The light pipe 908 directs the light from the LED outward to the room (e.g., either in a downward direction, as in FIG. 9, or toward the edge of the trim component, as in FIG. 8).

An additional example includes using the trim component 704 itself as the light pipe. In this example the trim would be made of a clear material that would enable light output from the visual feedback response light 810 to pipe out to an outer-surface 910 of the trim component 704. The trim component 704 may also include a secondary finish, such as a paint or a second molded part, applied such that portions of the trim component 704 that are not intended for illumination would maintain an appearance as unlit portions of the trim component 704 when visual feedback responses are provided to the trim component 704.

Another example may include making the outer-surface 910 of the trim component 704 opaque and transmissive. The light pipe element 908, for example, may feed into to the opaque and transmissive portion of the trim component 704 such that the light feeds to the opaque portion and passes through the trim component 704 to provide a visual feedback response. This example may include the benefit of the trim component 704 being a single part and capable of functioning normally as a trim component 704 in connection with the ceiling, rather than including a light pipe element in contact with the ceiling and the trim component 704 in contact with the light pipe (e.g., as in FIG. 8). In this arrangement, the opaque portion of the trim component 704 may be moved away from the ceiling plane 906 as long as the light piping portion enables light to pass through the opaque portion of the trim component 704 to provide the visual feedback responses.

In such an example, the trim component 704 may be a single injection molded plastic part where the thickness of the plastic varies where the visual feedback response is provided and to which the light pipe output is located. In this location, the plastic thickness enables transmission of the light through the plastic to provide the visual feedback response. The trim component 704 may be made of a clear or opaque material with textured or opaque portions that receive and output the visual feedback response. Other portions of the trim component 704 may be painted or covered in some way to provide a normal appearance to the remainder of the trim component 704.

In one or more of the examples described above with respect to FIGS. 1-9, the luminaire 102 may include adjustable or adaptive brightness control for the visual feedback of the luminaire 102. For example, the adjustable or adaptive brightness control may provide a mechanism to adjust the brightness of the visual feedback. This control may be accomplished through companion mobile application or with an ambient light sensor positioned within an illuminated room or within the luminaire 102 itself. In an example, the visual feedback brightness can be adjusted depending of the ambient light intensity in the room in which the luminaire 102 is located using measured ambient light levels from the ambient light sensor. The adjustment of visual feedback brightness may also be performed through user selections in the companion application settings.

In an example, a user can adjust the visual feedback brightness of the luminaire 102 using a settings menu of the user companion application. The brightness may be adjusted using the settings menu based on a specific time of day, a user selected brightness level, an operational status of the luminaire 102, or any other factor relevant to brightness selection of the visual feedback output. Another method of adjusting the visual feedback brightness is through the use of the ambient light sensor that measures the ambient light level around the luminaire and adjusting the visual feedback brightness accordingly. In an example, a darker ambient light reading may result in subdued colors output by the visual feedback, while a brighter ambient light reading may result in brighter colors output by the visual feedback.

Figure 10:
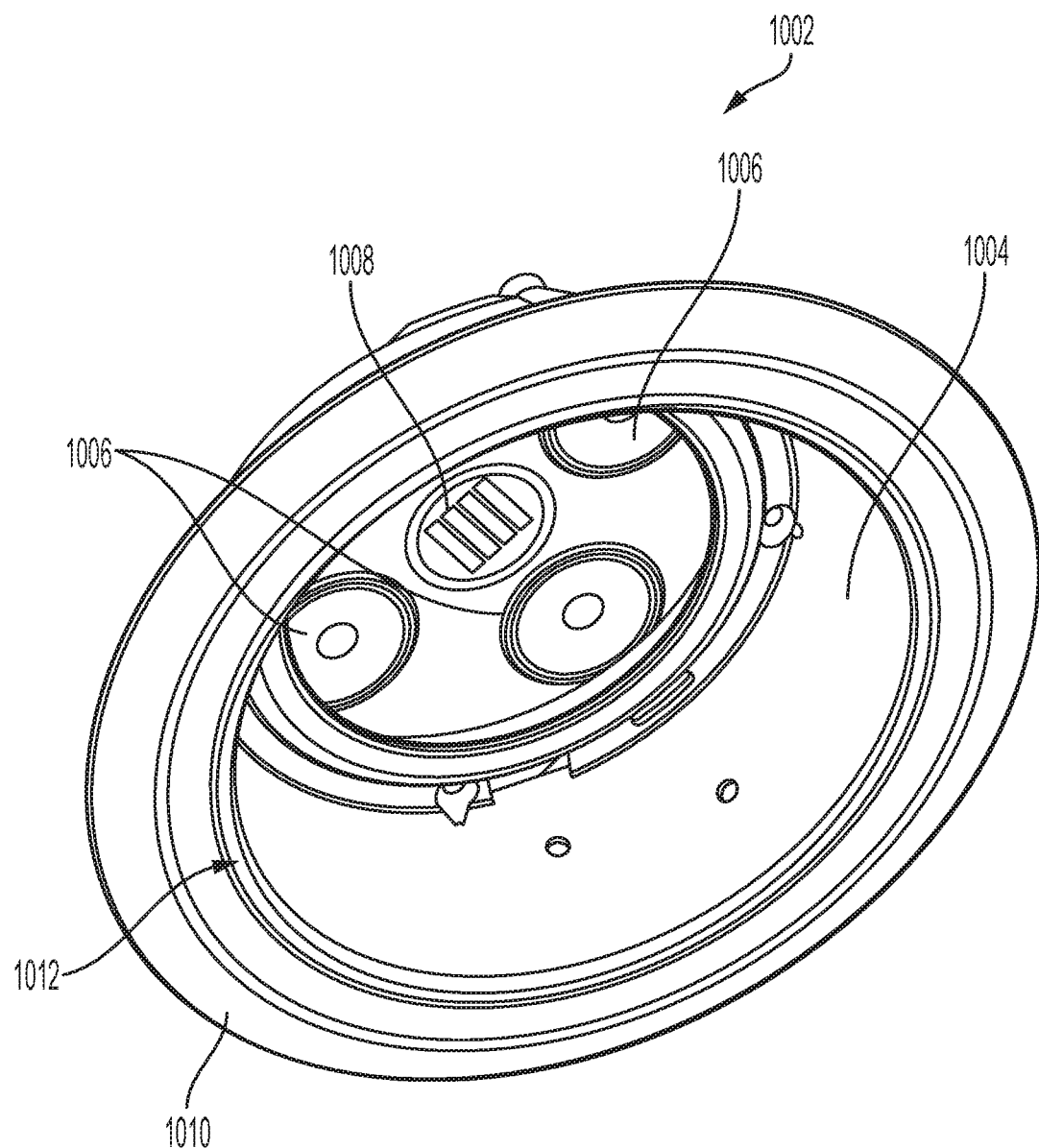
FIG. 10 depicts a perspective view of an example of a luminaire housing that uses a baffle to provide visual feedback, according to certain aspects of the present disclosure.
Figure 11:
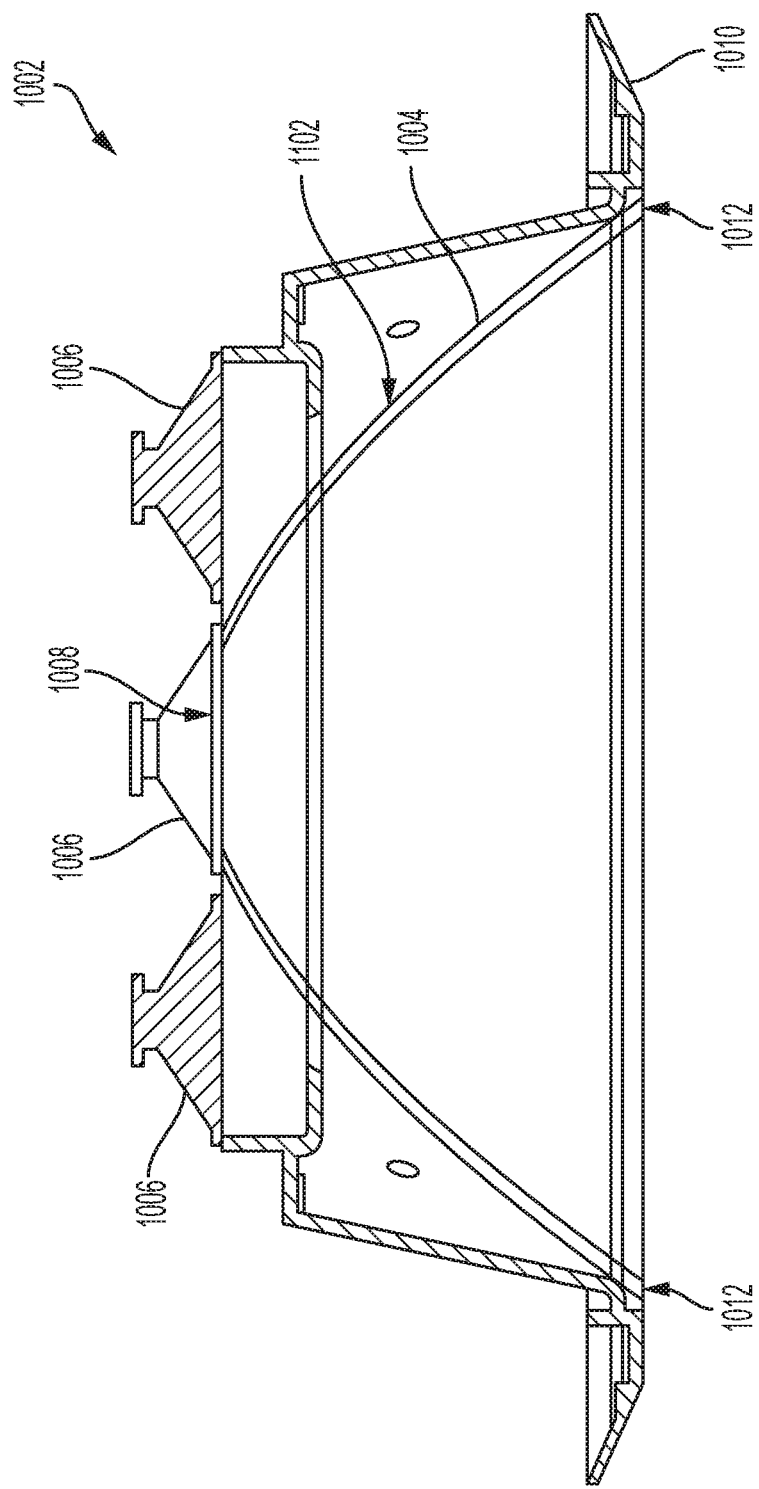
FIG. 11 depicts a side, sectional view of the luminaire housing of FIG. 10 that uses the baffle to provide visual feedback, according to certain aspects of the present disclosure.

FIG. 10 is a perspective view of an example of a luminaire housing 1002 that uses a baffle 1004 to provide visual feedback, and FIG. 11 is a side, sectional view of the luminaire housing 1002. Adding speakers 1006 to the luminaire housing 1002 involves many trade-offs between audio performance, light output, and, if used, visual feedback. Luminaire aesthetics rely on a smooth uniform appearance with minimal hot spots, limited color separation, and a clean transition of the luminaire housing 1002 into the ceiling. Audio performance of the luminaire relies on a clear path for air movement into the room. Generally, the larger the speaker in the luminaire housing 1002, the better the sound quality emitted from the luminaire housing 1002.

FIGS. 10 and 11 depict functionality added to the baffle 1004 of the luminaire housing 1002 that helps in overcoming difficulties of other visual feedback arrangements. In an example, the luminaire housing 1002 provides visual feedback in the baffle 1004. This may be achieved in multiple ways. For example, a wave guide may be positioned on an interior surface 1102 (i.e., a non-room facing side) of the baffle 1004. The wave guide may be a separate element that the baffle 1004 attaches to such that different baffle finishes can be applied or swapped out as needed or molded, painted, and finished as part of a single unit. Visual feedback LEDs can be positioned in a same area where general illumination sources 1008 are located or at some location behind the baffle 1004 that is not in a trim component 1010. Light may pipe down to an edge 1012 of the baffle 1004 so it appears at the ceiling plane or at some location along an entire length of the baffle 1004.

In another example, it is also possible that the entire baffle 1004 may glow uniformly or in certain patterns, such as the visual feedback chasing from a top of the baffle 1004 to a bottom of the trim component 1010, if multiple wave guides and light sources are used to provide additional visual feedback response functionality or aesthetics. The baffle 1004 may also be a simple diffuse material where the general illumination LEDs 1008 or an alternate type of light pipes would illuminate from behind the baffle 1004 to achieve the same effect in a different manner.

Another example removes the visual feedback functionality of the baffle 1004, and the baffle 1004 acts as a reflector while also allowing air from one or more of the speakers 1006 to pass. In this example, the general illumination light sources 1008 may be positioned in the middle of the luminaire housing 1002, with the speakers 1006 surrounding the general illumination light sources 1008. An acoustic mesh may be installed that allows air to pass through while providing a generally white reflective surface. The acoustic mesh may generally be installed in a shape similar to a downlight reflector of the luminaire housing 1002. For example, the acoustic mesh may make-up the baffle 1004, as depicted in FIG. 11.

Figure 12:
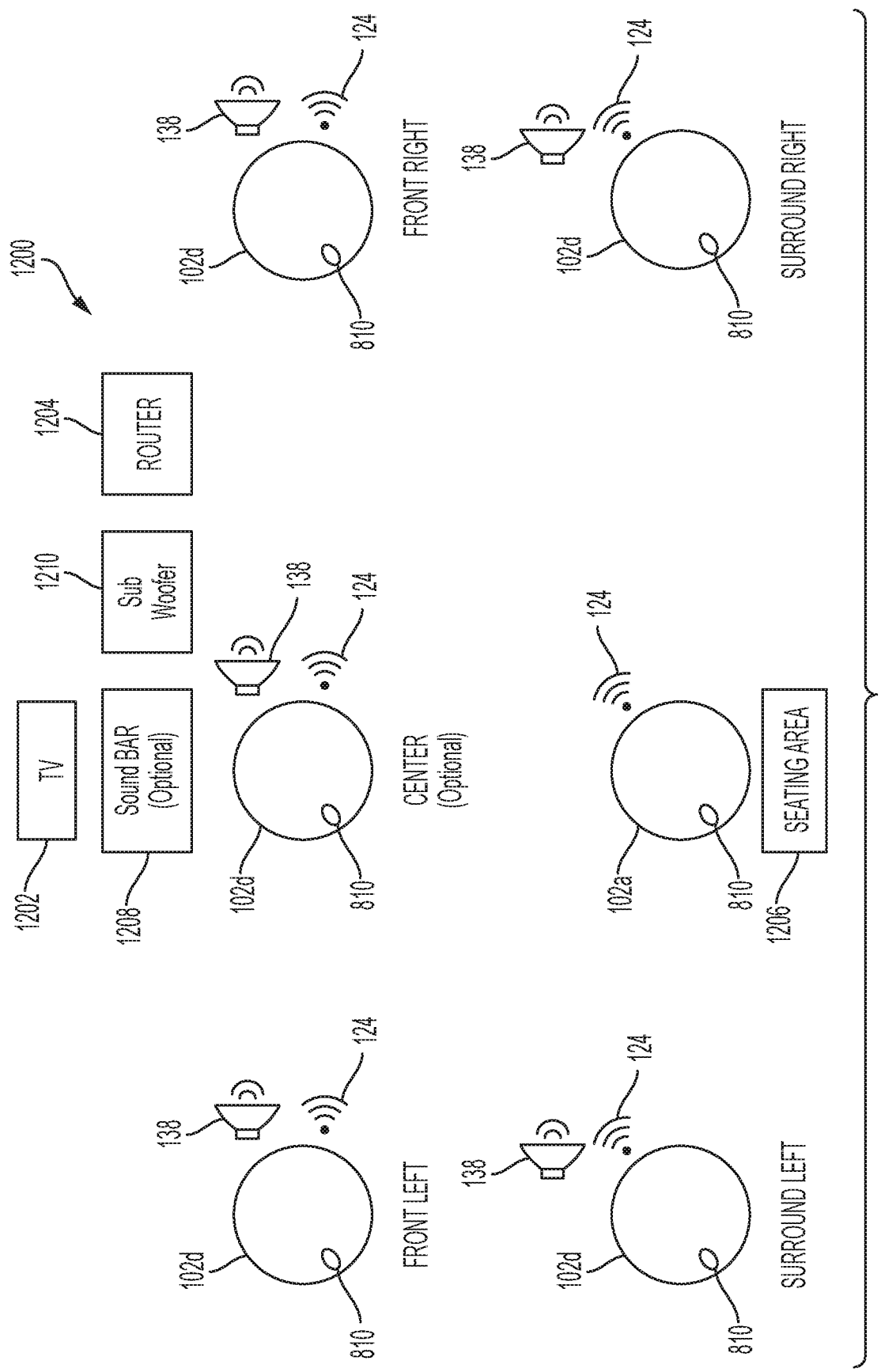
FIG. 12 depicts a schematic view of an arrangement of intelligent luminaires used to provide a dynamic audio visual experience, according to certain aspects of the present disclosure.

FIG. 12 is a schematic view of an arrangement 1200 of intelligent luminaires 102 used to provide a dynamic audio visual experience. In an example, a communication protocol is merged with downlighting speaker elements (e.g., the speakers 138 in the intelligent luminaires 102) to create a streamlined user experience that is easily installable and multifunctional.

Watching a movie on a television 1202, or other similar multimedia experience, using the smart connected luminaires 102 may create a dynamic audio visual environment. In such an example, the multiple luminaires 102 installed around the television 1202 may generate a 5.1 or 7.1 surround sound multimedia experience. In addition to a dynamic audio experience, the intelligent luminaires 102 may also provide the ability to dynamically change the lighting (e.g., a color, a dim level, or any other lighting components) to synchronize the lighting to the movie shown on the television 1202.

The intelligent luminaires 102 may communicate wirelessly between each other to create a specific audio and visual output for each element in the system. A receiver element in the system may receive an input audio/video signal from a data source (e.g., a DVD or Blu-ray player) and process the signal. Each individual intelligent luminaire 102 may communicate using Wi-Fi with a local router 1204. The local router 1204 may push streams of data from the receiver element to each individual intelligent luminaire 102 to define a specific audio signal for each intelligent luminaire 102 that is associated with the input audio/video signal. Further, the signals provided to the individual intelligent luminaires 102 may control a lighting output to synchronize with the input audio/video signal. For example, the light source 106, the visual feedback response source 810, or both may change in response to the input audio/video signal. In one example, the light source 106 may dim (e.g., to an emergency lighting level) upon transition from a display of previews on the television 1202 to a display of the actual movie or show on the television 1202. Further, the visual feedback response source 810, the light source 106, or both may be controlled to output colored light that corresponds with colors displayed on the television 1202. For example, an explosion displayed on the television 1202 may be accompanied by red, orange, and yellow colors being emitted from the intelligent luminaires 102. Other sound and lighting effects are also contemplated.

The speakers 138 of the individual intelligent luminaires 102 may be tuned for different sounding speakers. In an example, one or more speakers 138 of one or more intelligent luminaires 102 may be tuned to output bass responses while other speakers 138 of other intelligent luminaires 102 may be tuned to treble responses.

FIG. 12 includes a 5.1 surround sound arrangement of the intelligent luminaires 102. In the example, five intelligent luminaires 102*d* include the speakers 138 that may be tuned to varying functionalities of the 5.1 surround sound arrangement. A sixth intelligent luminaire 102*a* may be arranged directly over a seating area 1206. The intelligent luminaire 102*a* may be included to provide lighting effects without any sound output from a speaker. A sound bar 1208 and a subwoofer 1210 may also be provided in the arrangement 1200 to provide additional sound effects. While a 5.1 surround sound arrangement is depicted, other surround sound arrangements (e.g., a 7.1 surround sound arrangement) is also possible using similar techniques.

The wireless interfaces 124 of the intelligent luminaires 102 may enable wireless communication with the router 102 such that the intelligent luminaires 102 are able to receive lighting and sound control signals. In other examples, wired connections from the intelligent luminaires 102 are also possible for transmission of lighting and sound control signals to the intelligent luminaires 102.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A luminaire, comprising:
 a first light source positioned at a first level of a luminaire housing, wherein the first light source comprises a downlight that is installable within a ceiling and is configured to generate a light output;
 a trim component positioned at a second level of the luminaire housing different from the first level and configured to extend beyond the ceiling, the trim component comprising a visual feedback element configured to emit a visual feedback response, wherein the visual feedback element comprises:
  a light guide ring comprising at least one total internal reflection (TIR) light guide; and
 a control circuit positioned at the second level within the trim component, wherein the control circuit is configured to control operation of the visual feedback element.

2. The luminaire of claim 1, further comprising:
 a second light source, wherein the light guide ring of the visual feedback element comprises a plurality of light guides positioned in a ring around the first light source to emit the visual feedback response from the second light source.

3. The luminaire of claim 1, further comprising:
 a second light source, wherein the visual feedback element comprises the light guide ring between a face of the trim component and the ceiling in which the luminaire is installed, and wherein the light guide ring emits the visual feedback response from the second light source.

4. The luminaire of claim 1, wherein the trim component comprises a secondary finish on an outer surface of the trim component, and wherein the visual feedback element comprises one or more portions of the trim component without the secondary finish.

5. The luminaire of claim 1, further comprising:
 a speaker configured to generate an audio output from the luminaire, wherein the visual feedback response is synchronized with the audio output.

6. The luminaire of claim 1, wherein the visual feedback element comprises a second light source, and wherein the control circuit comprises a printed circuit board upon which the second light source is mounted.

7. The luminaire of claim 1, further comprising:
 a microphone mounted within the trim component, wherein the control circuit is configured to control the visual feedback response to confirm receipt of an audible command at the microphone.

8. A luminaire, comprising:
 a first light source positioned at a first level of a luminaire housing, wherein the first light source comprises a downlight that is installable within a ceiling and is configured to generate a light output;
 a trim component positioned at a second level of the luminaire housing different from the first level and configured to extend beyond the ceiling, the trim component comprising a visual feedback element configured to emit a visual feedback response, wherein the visual feedback element comprises:
  a light guide ring comprising at least one total internal reflection (TIR) light guide; and
  a baffle extending from the first level to the second level.

9. The luminaire of claim 8, wherein the visual feedback element comprises an end of the baffle at the second level, and wherein the baffle comprises the light guide ring configured to transmit a visual feedback light output from the first level to the second level as the visual feedback response.

10. The luminaire of claim 8, wherein the baffle terminates in the trim component as the visual feedback element, and wherein the baffle is configured to be backlit to glow uniformly to emit the visual feedback response.

11. The luminaire of claim 8, further comprising a speaker visually hidden by the baffle and configured to generate an audio output, wherein the baffle comprises an acoustically transparent material.

12. The luminaire of claim 11, wherein the audio output is synchronized with the visual feedback response.

13. The luminaire of claim 8, wherein the visual feedback element further comprises:
 a second light source configured to generate the visual feedback response and to direct the visual feedback response into the light guide ring.

14. The luminaire of claim 8, further comprising:
 a microphone; and
 a control circuit configured to control the visual feedback response to confirm receipt of an audible signal at the microphone.

15. A luminaire, comprising:
 a first light source configured to generate a light output, wherein the first light source comprises a downlight that is installable within a ceiling and is configured to generate a light output;
 a trim component configured to extend beyond the ceiling, the trim component comprising a visual feedback element configured to emit a visual feedback response output, wherein the visual feedback element comprises:
  a light guide ring comprising at least one total internal reflection (TIR) light guide; and
  a second light source configured to provide the visual feedback response output to the light guide ring of the visual feedback element;
 a speaker configured to generate an audio output from the luminaire;
 a control circuit configured to control operation of the visual feedback element; and
 a wireless interface configured to communicatively couple the luminaire with other devices.

16. The luminaire of claim 15, wherein the control circuit is configured to control the visual feedback element to emit the visual feedback response output in response to an interaction of the luminaire with the other devices through the wireless interface.

17. The luminaire of claim 15, wherein the control circuit is configured to synchronize the visual feedback response output with the audio output from the speaker.

* * * * *